US012795590B2

(12) United States Patent
Iwabuchi et al.

(10) Patent No.: US 12,795,590 B2
(45) Date of Patent: Nov. 10, 2026

(54) WIRELESS COMMUNICATION SYSTEM, WIRELESS COMMUNICATION METHOD, AND WIRELESS COMMUNICATION DEVICE

(71) Applicant: NTT, Inc., Tokyo (JP)

(72) Inventors: Masashi Iwabuchi, Musashino (JP); Tomoaki Ogawa, Musashino (JP); Yasushi Takatori, Musashino (JP)

(73) Assignee: NTT, Inc., Tokyo (JP)

(*) Notice: Subject to any disclaimer, the term of this patent is extended or adjusted under 35 U.S.C. 154(b) by 277 days.

(21) Appl. No.: 18/702,811

(22) PCT Filed: Oct. 22, 2021

(86) PCT No.: PCT/JP2021/039156

§ 371 (c)(1),
(2) Date: Apr. 19, 2024

(87) PCT Pub. No.: WO2023/067813

PCT Pub. Date: Apr. 27, 2023

(65) Prior Publication Data

US 2026/0032619 A1 Jan. 29, 2026

(51) Int. Cl.
*H04W 64/00* (2009.01)

(52) U.S. Cl.
CPC .................................. *H04W 64/00* (2013.01)

(58) Field of Classification Search
CPC ...... H04W 64/00; H04W 16/26; H04W 28/18
See application file for complete search history.

(56) References Cited

U.S. PATENT DOCUMENTS

2010/0203877 A1* 8/2010 Yamashita ............ H04W 48/16 455/418
2015/0358890 A1 12/2015 Xu et al.
(Continued)

FOREIGN PATENT DOCUMENTS

CN 108307484 A * 7/2018 ............ H04W 48/16
JP 2009-027347 A 2/2009
(Continued)

OTHER PUBLICATIONS

Morita et al., "A Proposal of Radio Resource Control in LTE Base Stations Based on Predicting QoE Degradation", IEICE Technical Report RCS2016-209, Dec. 2016, pp. 13-18 including English Abstract.

(Continued)

*Primary Examiner* — Farid Seyedvosoghi
(74) *Attorney, Agent, or Firm* — XSENSUS LLP

(57) ABSTRACT

A wireless communication system includes a first base station, a second base station, a terminal connectable to both the first base station and the second base station, and a wireless communication device that is connected to both the first base station and the second base station and controls the coverage of the second base station. The coverage of the second base station is superimposed on the coverage of the first base station and is smaller than the coverage of the first base station. The terminal detects a user's action, acquires information regarding a predetermined user's action performed on the host terminal, and estimates position information of the host terminal. The wireless communication device determines the coverage of the second base station, based on the information regarding the user's action and the position information acquired from the terminal via the first base station or the second base station.

8 Claims, 16 Drawing Sheets

(56) References Cited

U.S. PATENT DOCUMENTS

| | | | | |
|---|---|---|---|---|
| 2019/0132042 | A1* | 5/2019 | Tachigi .............. | H04B 7/15507 |
| 2020/0187083 | A1* | 6/2020 | Shimizu .............. | H04W 64/003 |

FOREIGN PATENT DOCUMENTS

| | | | | |
|---|---|---|---|---|
| JP | 2011-172063 | A | | 9/2011 |
| JP | 2016-504887 | A | | 2/2016 |
| JP | 2019-022089 | A | | 2/2019 |
| JP | 2019145988 | A | * | 8/2019 |
| WO | 2009/011299 | A1 | | 1/2009 |

OTHER PUBLICATIONS

Suzuki et al., "Visualization of Indoor environment by Sensor Group and Promoting Improvement by Gamification", IEICE Technical Report ASN2018-76, Nov. 2018, pp. 127-130 including English Abstract.

* cited by examiner

WIRELESS COMMUNICATION SYSTEM, WIRELESS COMMUNICATION METHOD, AND WIRELESS COMMUNICATION DEVICE

CROSS-REFERENCE TO RELATED APPLICATION

The present application is based on PCT filing PCT/JP2021/039156, filed on Oct. 22, 2021, the contents of which are incorporated herein by reference in their entirety.

TECHNICAL FIELD

The present invention relates to a wireless communication system, a wireless communication method, and a wireless communication device.

BACKGROUND ART

In recent years, data traffic for mobile communication has suddenly increased due to the distribution of high-speed wireless access environments such as Long Term Evolution (LTE) and LTE-Advanced and the spread of smartphones and tablet terminals. Particularly, video viewing increased at an annual rate of 55% from 2015 to 2021, and it is said that video viewing occupied about 70% of all mobile data traffic in 2021. In addition to videos, applications of mobile communication such as viewing of Web pages, social networking services (SNSs), and Voice over Internet Protocol (VOIP) are diversifying.

Meanwhile, Quality of Experience (QoE) indicating a user's quality of experience has attracted attention as an indicator that affects a value of a network in recent years. Quality of Service (QOS) indicating the service quality provided by a network is a scale of service quality viewed by a communication carrier or a service provider, such as packet losses, packet delays, and fluctuation of packet arrival times. On the other hand, QoE that has attracted attention in recent years represents a scale of service quality of applications that users experience, such as interruption of reproduction of videos and Web download times.

In mobile communication in which traffic has increased and diversified, it is important to maintain and improve QoE in order for users to continuously use services. In other words, in consideration of a trend that users continue to use services as long as a predetermined QoE is satisfied and of a limitation of wireless resources, it is important not only to simply improve QoS but also to maintain and improve predetermined QoE for continuous utilization of the services.

However, there may be a case where it is not possible to allocate sufficient wireless resources in a high-load environment where users are densely located. In such an environment, the required QoE (QoE that is a guideline to be achieved in order to allow users to continuously use applications such as Web and moving images) may not be able to be satisfied. Therefore, a wireless resource control scheme for an LTE base station based on an application-required quality that is needed to satisfy the required QoE has been proposed in the related art.

FIG. 16 is a diagram illustrating an overview of the wireless resource control scheme for an LTE base station based on application required quality that is needed to satisfy the required QoE in the related art.

In FIG. 16, a configuration of a mobile network 100 is a Heterogeneous Network (HetNet) configuration in which a large number of small cells 102 are additionally installed in an area where users are densely located, in addition to macrocells 101 in the related art, in order to efficiently accommodate increasing traffic.

The macrocells 101 are configured of evolved Nodes B (eNodeB: LTE base stations) 103.

The small cells 102 are configured of Centralized Radio Access Networks (C-RANs) 104, and each of them accommodates user equipment (UE; user terminals) 105.

Each C-RAN 104 is configured of a Distributed Unite (DU: distributed station) 106 that performs wireless resource control of a layer 2 (data link layer) in a centralized manner and a Radio Unit (RU: wireless station) 107 that performs processing of a layer 1 (physical layer) on the basis of the wireless resource control achieved by the DU 106.

The DU 106 and the RU 107 are connected by fronthaul achieved by an optical fiber. One small cell 102 is provided for each RU 107. The DU 106 and the eNodeB 103 are connected to a relay server 109 outside the mobile network via an Evolved Packet Core (EPC: LTE core network) 108 of the core network.

The Internet 110 is configured of a cloud server 111 that distributes application services such as videos and Web and the relay server 109.

The relay server 109 operates as a transmission proxy in Transmission Control Protocol/Internet Protocol (TCP/IP) communication and separates and relays upstream Transmission Control Protocol (TCP) connection on the cloud server side and downstream TCP connection on the mobile network side.

In Non Patent Literature 1, the relay server 109 ascertains the required QoE for each application and analyzes the application-required quality (for example, a transmission completion deadline) from a current status of traffic for all content. The relay server 109 analyzes the application requiring quality for each Internet Protocol (IP) packet, applies it to an IP header, and provides a notification to the DU 106 or the eNodeB 103. The DU 106 or the eNodeB 103 that has received the notification collects the application required quality and uses it for wireless resource control.

For example, QoE for a video is evaluated on the basis of reproduction interruption caused by depletion of a buffer on the side of the UE 105 during viewing of the video, and occurrence of reproduction interruption is regarded as degradation of the QoE. Also, QoE for Web is evaluated by a download time until entire information is displayed after a Web page is accessed, and QoE is regarded as being degraded in a case where the download time has exceeded a predetermined threshold value. Degradation of QoE means that required QoE is not satisfied, and means that the user has to interrupt utilization of an application and a throughput of the entire system is also degraded as a result.

In other words, the relay server 109 grasps required QoE of an application, analyzes application required quality, notifies the eNodeB 103 or the DU 106 of the result, and controls wireless resources and connected cells thereby to improve QoE in Non Patent Literature 1. The DU 106 curbs degradation of QoE through wireless resource control. An expected time is calculated from the buffer size and the allocated resource block (RB), a transmission completion deadline that satisfies QoE and the expected time are compared, and resource allocation is adjusted such that the transmission completion deadline is not exceeded. Also, in a case where high-load cells are present, connection of users with margins of QoE are switched to other cells with priority thereby to improve QoE of entire users.

Also, Non Patent Literature 2 has proposed a mechanism of visualizing an indoor environment, guiding handling of a change in environment with a gamification element, and thereby improving the indoor environment.

CITATION LIST

Non Patent Literature

Non Patent Literature 1: Morita, Kumagai, Nobukiyo, "A Proposal of Radio Resource Control in LTE Base Stations Based on Predicting QoE Degradation", IEICE Technical Report RCS2016-209

Non Patent Literature 2: Suzuki, Iwai, "Visualization of Indoor environment by Sensor Group and Promoting Improvement by Gamification", IEICE Technical Report ASN2018-76

SUMMARY OF INVENTION

Technical Problem

However, in Non Patent Literature 1, the relay server 109 estimates the QoE of the user and the actual user's experience is thus not taken into consideration. Also, degradation of user's QoE is affected not only by a reception level but also combinations of a large number of factors such as delays, jitters, and the like, and finally, it depends on subjective evaluation of the user, and it is thus difficult to determine whether the communication time actually affects it. Therefore, it is difficult to grasp and improve QoE based on the user's subjective evaluation (that is, communication quality based on the user's subjective evaluation) by the method in Non Patent Literature 1.

Also, although a gamification element is used in Non Patent Literature 2, it is used for monitoring an indoor environment and is not used for wireless communication.

Thus, an object of the present disclosure is to concentrate wireless resources on users or areas that truly require the wireless resources and improve communication quality based on users' subjective evaluation, by grasping the communication quality based on the users' subjective evaluation on the basis of a predetermined action of the user and feeding back the grasped communication quality.

Solution to Problem

A wireless communication system according to an aspect is a wireless communication system including: a first base station that forms a coverage of a first frequency band; a second base station that forms a coverage of a second frequency band that is different from the first frequency band in a smaller region than a region of the first frequency band with the coverage of the second frequency band superimposed on the coverage of the first frequency band; a terminal that is able to be connected to both the first base station and the second base station; and a wireless communication device that is connected to both the first base station and the second base station and controls the coverage of the second base station, in which the terminal includes a user action detection unit that detects a user's action, a user action information acquisition unit that acquires information regarding the user's action when it is determined that the user's action detected by the user action detection unit is a predetermined user's action performed on the host terminal, and a position estimation unit that estimates position information of the host terminal, and the wireless communication device includes a determination unit that determines the coverage that the second base station covers, on the basis of the information regarding the user's action and the position information acquired from the terminal via the first base station or the second base station.

Note that in the wireless communication system according to an aspect, the predetermined user's action may be user's shaking of the host terminal or user's tapping of the host terminal, and the information regarding the user's action may be vibration information generated by the host terminal being shaken by the user or tap information generated by the host terminal being tapped by the user.

Also, in the wireless communication system according to an aspect, the determination unit may specify an area of the coverage that the second base station covers on the basis of the information regarding the user's action or may determine distribution of time resources in a plurality of areas regarded as coverages by the second base station.

Also, the wireless communication system according to an aspect may further include a plurality of relay devices that relay the second base station in the second frequency band, and the terminal may be connected to the second base station via any of the plurality of relay devices, and the determination unit may determine coverages that the plurality of relay devices cover instead of the second base station.

Also, the wireless communication system according to an aspect may further include a distribution server that is connected to the wireless communication device, and the distribution server may include a computing unit that creates a power relationship diagram by which the terminal is able to display, in a GUI format, a coverage after being controlled by the wireless communication device and a predicted value of a communication speed at each point on the basis of information acquired from the wireless communication device, and a communication unit that distributes the power relationship diagram created by the computing unit to the terminal, and the terminal may further include a display unit that displays the power relationship diagram distributed from the distribution server in real time in the GUI format.

Also, in the wireless communication system according to an aspect, the distribution server may repeatedly perform the creation of the power relationship diagram and the distribution of the created power relationship diagram to the terminal at predetermined time intervals.

A wireless communication method according to an aspect is a wireless communication method performed in a wireless communication system including a first base station that forms a coverage of a first frequency band, a second base station that forms a coverage of a second frequency band that is different from the first frequency band in a smaller region than a region of the first frequency band with the coverage of the second frequency band superimposed on the coverage of the first frequency band, a terminal that is able to be connected to both the first base station and the second base station, and a wireless communication device that is connected to both the first base station and the second base station and controls the coverage of the second base station, the method including: by the terminal, detecting a user's action, and in a case where it is determined that the detected user's action is a predetermined user's action performed on the host terminal, acquiring information regarding the user's action and estimating position information of the host terminal; and by the wireless communication device, determining a coverage that the second base station covers on the basis of the information regarding the user's action and the position information acquired from the terminal via the first base station or the second base station.

A wireless communication device according to an aspect is a wireless communication device in a wireless communication system including a first base station that forms a coverage of a first frequency band, a second base station that forms a coverage of a second frequency band that is different from the first frequency band in a smaller region than a region of the first frequency band with the coverage of the second frequency band superimposed on the coverage of the first frequency band, a terminal that is able to be connected to both the first base station and the second base station, and a wireless communication device that is connected to both the first base station and the second base station and controls the coverage of the second base station, the wireless communication device including: a determination unit that acquires information regarding a user's action acquired when the terminal detects the user's action and the detected user's action is determined to be a predetermined user's action performed on the host terminal and position information of the host terminal estimated by the terminal from the terminal via the first base station or the second base station and determines the coverage that the second base station covers on the basis of the acquired information regarding the user's action and the position information.

Advantageous Effects of Invention

According to the present disclosure, it is possible to concentrate wireless resources on users or areas that truly require the wireless resources and to improve communication quality based on users' subjective evaluation, by grasping the communication quality based on the users' subjective evaluation on the basis of a predetermined action of the user and feeding back the grasped communication quality.

DESCRIPTION OF EMBODIMENTS

Hereinafter, embodiments of a wireless communication system, a wireless communication method, and a wireless communication device according to the present disclosure will be described by using the drawings.

Configuration of First Embodiment

Figure 1:
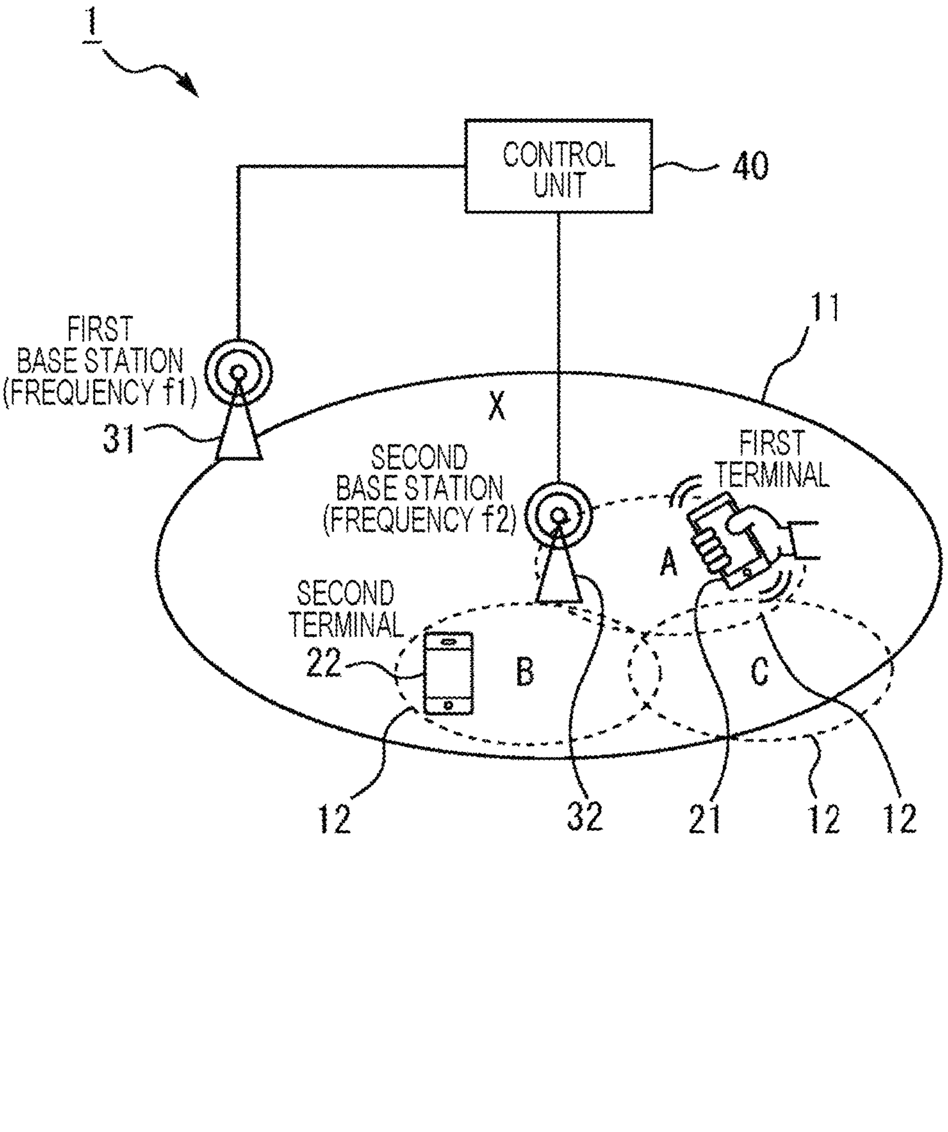
FIG. 1 is a diagram illustrating a configuration example of a wireless communication system according to a first embodiment.

FIG. 1 is a diagram illustrating a configuration example of a wireless communication system 1 according to a first embodiment. As illustrated in FIG. 1, the wireless communication system 1 has a first terminal 21, a second terminal 22, a first base station 31, a second base station 32, and a control unit 40.

Each of the first terminal 21 and the second terminal 22 is a communication terminal that can be connected to both the first base station 31 and the second base station 32. Also, the first terminal 21 and the second terminal 22 are always connected to the first base station 31. Note that the first terminal 21 and the second terminal 22 will be referred to as "terminals 20" below when they are collectively referred to in the present embodiment. Each terminal 20 has a sensing function for detecting user's action. Note that the sensing function of the terminal 20 is an example of a "user action detection unit" or a "vibration detection unit".

The first base station 31 is a base station or an extension station and forms a coverage (a range in which radio waves can be received) 11 of a frequency band f1. The coverage 11 of the frequency band f1 is an area X in FIG. 1. Note that the frequency band f1 is an example of a "first frequency band".

The second base station 32 is a base station or an extension station and forms a coverage 12 of a frequency band f2. The coverage 12 of the frequency band f2 is a smaller region than the coverage 11 of the frequency band f1 in FIG. 1 and is disposed to be superimposed inside the coverage 11 of the first base station 31. It is possible to improve communication quality by superimposing the coverage 12 of the second base station 32 on the coverage 11 of the first base station 31. The second base station 32 can have any of areas A, B, and C as the coverage 12 in FIG. 1 and may be able to switch areas in a time division manner, for example. Note that the frequency band f2 is an example of a "second frequency band". Note that the first base station 31 and the second base station 32 will be referred to as "base stations 30" below when they are collectively referred to in the present embodiment.

The control unit (wireless communication device) 40 is, for example, an external server, a central unit (CU: centralized station), a DU, or a next Generation Node B (gNodeB:

5G base station) and is connected to the first base station 31 and the second base station 32. Note that the control unit 40 is an example of a "wireless communication device".

Figure 2:
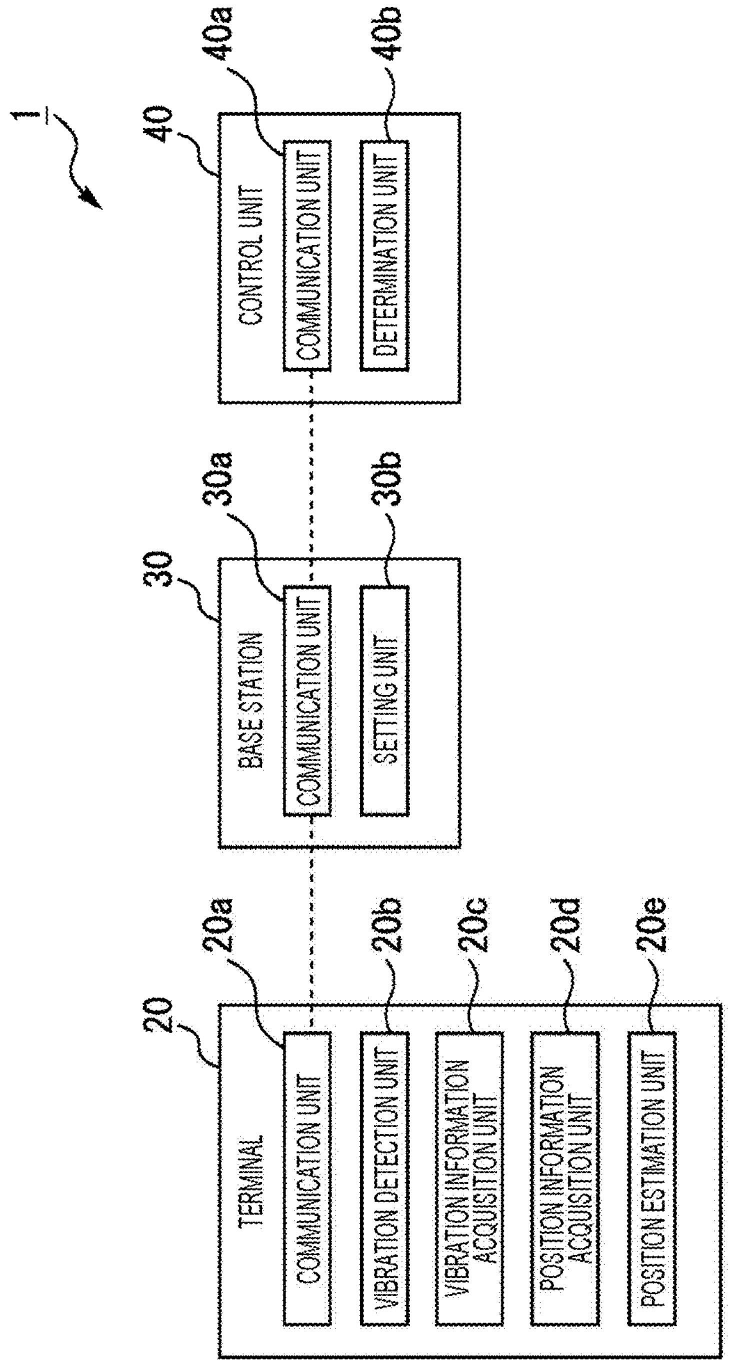
FIG. 2 is a diagram illustrating an example of configurations that terminals, base stations, and a control unit illustrated in FIG. 1 have.

FIG. 2 is a diagram illustrating an example of configurations that the terminals 20, the base stations 30, and the control unit 40 illustrated in FIG. 1 have. Note that illustration of general configurations that the ordinary terminals 20, base stations 30, and control unit 40 are omitted in FIG. 2.

Each terminal 20 is, for example, an information communication terminal such as a smartphone or a tablet terminal and has a communication unit 20*a*, a vibration detection unit 20*b*, a vibration information acquisition unit 20*c*, a position information acquisition unit 20*d*, and a position estimation unit 20*e*.

The communication unit 20*a* is connected to the base station 30 in a wired or wireless manner and transmits and receives information or signals to and from them. The communication unit 20*a* transmits information and signals of the terminal 20 to the base station 30, for example.

The vibration detection unit 20*b* is, for example, a sensor (incorporated sensor) or the like having a sensing function, such as an acceleration sensor (motion sensor) or an angular speed sensor (gyro sensor) and detects shaking or the like of the host terminal 20 by a user. Note that the vibration detection unit 20*b* is an example of a "user action detection unit" that detects a user's action performed on the host terminal.

The vibration information acquisition unit 20*c* determines which of vibration generated when the terminal 20 is shake and vibration generated when the terminal 20 is carried the vibration applied to the terminal 20 is through machine learning or the like, for example. Also, when the vibration information acquisition unit 20*c* determines that the vibration applied to the terminal 20 is vibration generated when the terminal 20 is shaken, the vibration information acquisition unit 20*c* measures and acquires vibration information such as the number of vibrations and a vibration time, for example. Note that the vibration information acquisition unit 20*c* is an example of a "user action information acquisition unit" that acquires information regarding a predetermined user's action performed on the host terminal.

The position information acquisition unit 20*d* is a Global Positioning System (GPS), for example, and acquires position information of the host terminal 20.

The position estimation unit 20*e* estimates the position of the host terminal 20 from a status of radio waves and information from the GPS, for example.

The base station 30 is a base station or an extension station and forms a coverage of a predetermined frequency band. The base station 30 has a communication unit 30*a* and a setting unit 30*b*.

The communication unit 30*a* is connected to the terminal 20 and the control unit 40 in a wired or wireless manner and transmits and receives information or signals to and from them. The communication unit 30*a* receives the information and the signal transmitted from the terminal 20 or the control unit 40, for example, and transmits them to another terminal 20 or control unit 40.

The setting unit 30*b* sets a designated parameter provided as a notification from the control unit 40, for example.

The control unit (wireless communication device) 40 is, for example, an external server, a CU, a DU, or gNodeB and is connected to the first base station 31 and the second base station 32. The control unit 40 has a processor, which is not illustrated, such as a Central Processing Unit (CPU), a Micro Processing Unit (MPU), or a Graphics Processing Unit (GPU) that operate by executing a program, for example. The control unit 40 causes the processor, which is not illustrated, to operate by executing a predetermined program stored in the memory 92 (see FIG. 15), which will be described later, for example, and integrally controls operations of each configuration in the wireless communication system 1.

The control unit 40 has configurations or functions of a communication unit 40*a* and a determination unit 40*b*. Note that each function of the control unit 40 may be implemented by a control program executed by a computing processing device of the control unit 40. Also, each of these functions may be implemented by hardware.

The communication unit 40*a* is connected to the base station 30 in a wired or wireless manner and transmits and receives information or signals to and from it. The communication unit 40*a* receives the information and the signals transmitted from the base station 30 and transmits the information and the signal of the control unit 40 to the base station 30, for example.

The determination unit 40*b* determines the coverage 12 of the second base station 32 by using a terminal notification signal provided as a notification from the terminal 20 via the base station 30. The determination unit 40*b* evaluates presence/absence of detecting terminals, the number of detecting terminals, and the number of times of detection, for example, and determines the coverage 12 to be covered by the second base station 32.

Operation of First Embodiment

Figure 3:
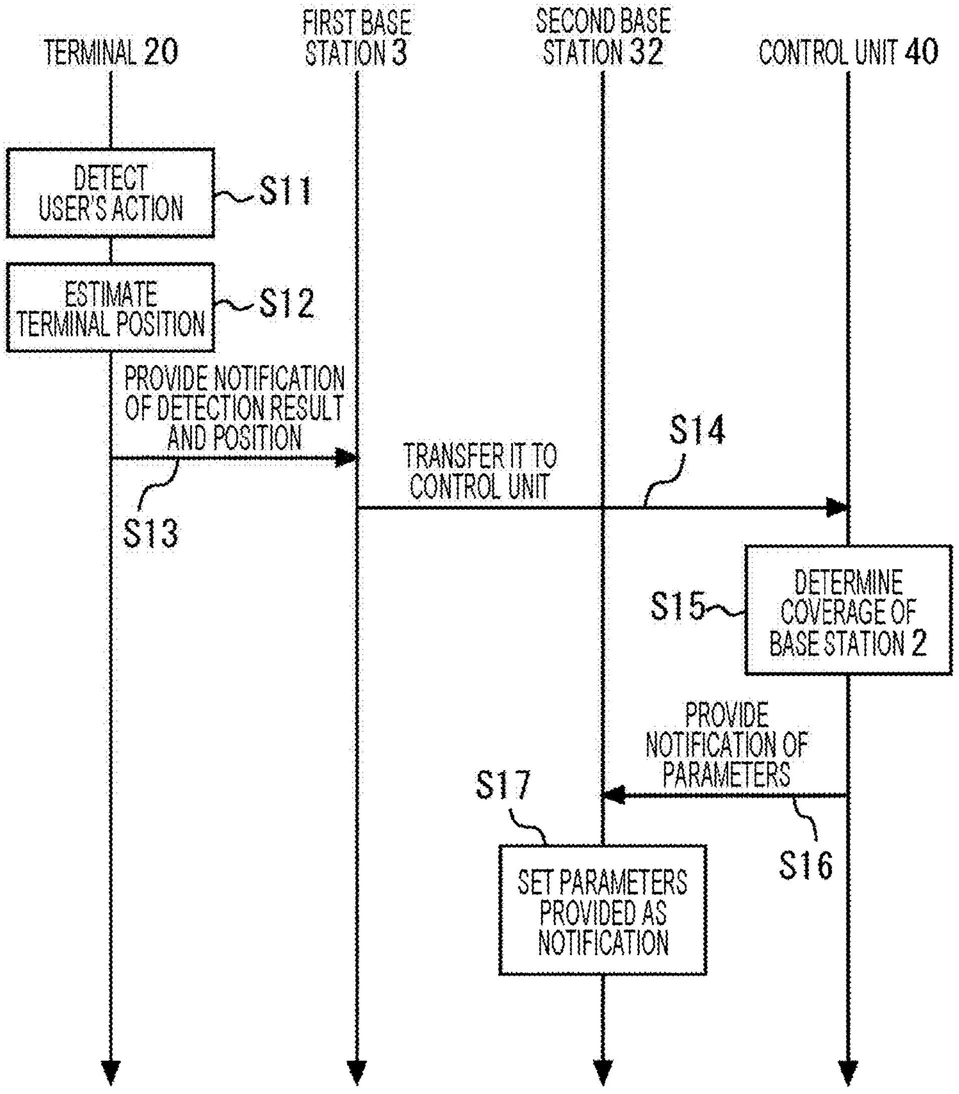
FIG. 3 is a diagram illustrating a processing flow of the wireless communication system illustrated in FIGS. 1 and 2.

FIG. 3 is a diagram illustrating a processing flow of the wireless communication system 1 illustrated in FIGS. 1 and 2.

In step S11, the terminal 20 detects a user's action. In other words, the terminal 20 detects a user's action by using a terminal function. For example, the user's action of "shaking the terminal" is present as an intuitive action when communication quality is degraded. Therefore, the terminal 20 detects the action of "shaking the terminal" by using a sensor (for example, an acceleration sensor) incorporated in the terminal.

In step S12, the terminal 20 estimates the position of the terminal 20. Note that any estimation method may be used.

In step S13, the terminal 20 associates the user's action information detected in step S11 with the position information of the terminal 20 estimated in step S12 and provides a notification from the terminal 20 (detecting terminal 20) to the first base station 31.

In step S14, the first base station 31 transfers a terminal notification signal including the user's action information and the position information provided as a notification from the terminal 20 to the control unit 40.

In step S15, the control unit 40 determines the coverage 12 to be covered by the second base station 32 by using information regarding the terminal notification signal provided as a notification from the first base station 31. At this time, the control unit 40 evaluates presence/absence of detecting terminals, the number of detecting terminals, and the number of times of detection and determines the coverage 12 to be covered by the second base station 32.

In step S16, the control unit 40 notifies the second base station 32 of control parameters needed by the second base station 32 to set the area determined by the control unit 40 as the coverage 12.

In step S17, the second base station 32 sets the control parameters (a communication parameter, a designation parameter) provided as a notification from the control unit 40.

Figure 4:
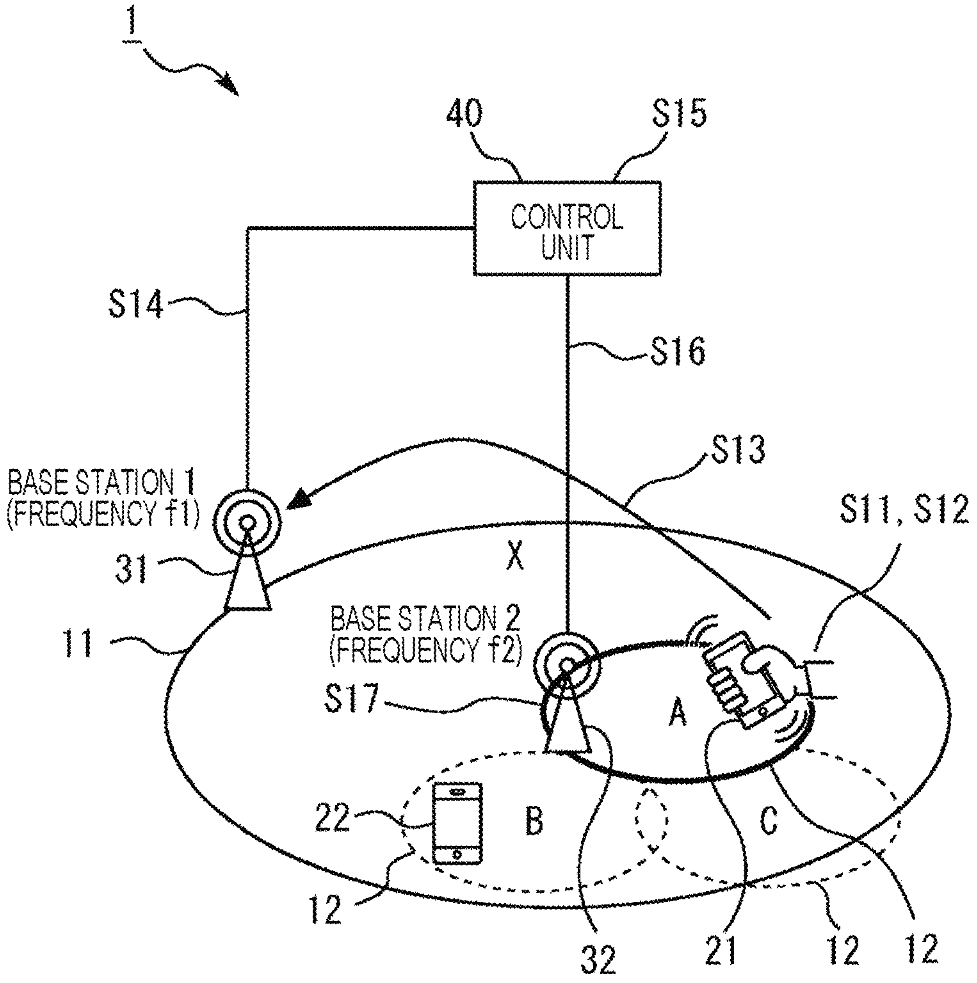
FIG. 4 is a diagram illustrating an example of operations of the wireless communication system illustrated in FIGS. 1 to 3.

FIG. 4 is a diagram illustrating an example of operations of the wireless communication system 1 illustrated in FIGS. 1 to 3. Note that FIG. 4 will be described with the same step reference numbers applied to the same operations as the operations in the steps in FIG. 3.

In step S11, the terminal 20 detects a predetermined action of the user. As illustrated in FIG. 4, the user of the first terminal 21 shakes the first terminal 21 as an intuitive action when he/she feels degradation of QoE, for example. The first terminal 21 detects the shaking. The first terminal 21 determines which of vibration applied in response to degradation of QoE and vibration when the first terminal 21 is carried the vibration applied to the first terminal 21 is from how the vibration is applied. For example, it is possible to make the determination through machine learning or the like. The first terminal 21 measures a cumulative duration time of vibration and the number of times of vibration in response to degradation of QoE applied in a specific period of time.

In step S12, the terminal 20 estimates the position of the terminal 20. For example, when the first terminal 21 detects a predetermined user's action in step S11, the position information of the first terminal 21 is estimated by using information acquired by the position information acquisition unit 20*d* (a GPS, for example) mounted on the first terminal 21, for example.

In step S13, the first terminal 21 associates the user's action information detected in step S11 with the position information of the first terminal 21 estimated in step S12 and provides a notification from the first terminal 21 that is a detecting terminal to the first base station 31.

In step S14, the first base station 31 transfers (notifies) a terminal notification signal that is information provided as a notification from the first terminal 21 to the control unit 40.

In step S15, the control unit 40 determines the coverage 12 to be covered by the second base station 32 by using the information of the terminal notification signal including the user's action information and the position information provided as a notification from the first base station 31. At this time, the control unit 40 evaluates presence/absence of detecting terminals, the number of detecting terminals, and the number of times of detection and determines the coverage 12 to be covered by the second base station 32. For example, the control unit 40 determines which of the areas A, B, and C is to be set as the coverage 12 to be covered by the second base station 32 from the cumulative duration time of the vibration, the number of times of vibration provided as a notification or a score or the like calculated by using them.

Figure 5:
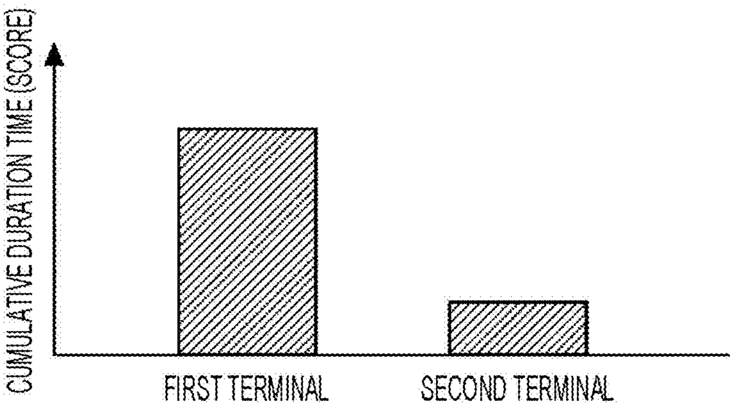
FIG. 5 is a diagram illustrating a cumulative duration time (or a score) for each terminal.

FIG. 5 is a diagram illustrating a cumulative duration time (or a score) for each terminal. In FIG. 5, the horizontal axis represents the first terminal 21 and the second terminal 22, and the vertical axis represents the cumulative duration time (or the score) during which the terminal notification signal is provided as a notification.

In FIG. 5, the cumulative duration time during which the terminal notification signal is provided as a notification to the first terminal 21 is longer than that for the second terminal 22. In this case, the control unit 40 compares the cumulative duration time for each terminal, for example, and selects the first terminal 21 with the longest cumulative duration time. Also, the control unit 40 determines the area A as the coverage 12 to be covered by the second base station 32 since it is possible to determine that the first terminal 21 belongs to the area A from the terminal position information of the first terminal 21.

Note that the control unit 40 may distribute time resources regarded as coverages by the second base station 32 in accordance with a score. In the condition in FIG. 5, for example, 80% of time resources may be distributed to the area A where the first terminal 21 is present while the remaining resources may be distributed to the area B where the second terminal 22 is present. In other words, the control unit 40 may switch the areas to be regarded as coverages by the second base station 32 in a time division manner in accordance with the store.

Returning to FIG. 4, the control unit 40 notifies the second base station 32 of the control parameters (the communication parameter, the designation parameter) needed by the second base station 32 to set the area A determined by the control unit 40 as the coverage 12 in step S16. For example, the control unit 40 notifies the second base station 32 of an antenna tilt, an antenna direction, a beamforming weight, a transmission power, and the like. Note that the control unit 40 designates a position and provides a notification in a case where the second base station 32 is movable.

In step S17, the second base station 32 sets the control parameters (a communication parameter, a designation parameter) provided as a notification from the control unit 40. The second base station 32 sets, for example, the antenna tilt, the antenna direction, the beamforming weight, the transmission power, and the like provided as a notification from the control unit 40. Note that the second base station 32 sets a position in a case where it is movable. Also, the second base station 32 may be a repeater or a reflector. These relay devices can dynamically change the coverage.

Effects and Advantages of First Embodiment

In the first embodiment illustrated in FIGS. 1 to 5, the control unit 40 grasps the degradation of QoE based on user's subjective evaluation (that is, communication quality based on user's subjective evaluation), for example, user's action information such as shaking of the terminal 20, for example, via the notification from the first base station 31 along with the position information of the terminal 20 (S11 to S14). Then, the control unit 40 determines the coverage 12 of the second base station 32 in accordance with the information of the terminal notification signal including the user's action information and the position information of the terminal 20 provided as a notification from the first base station 31 (S15, S16). Then, the second base station 32 sets the parameters provided as a notification from the control unit 40 (S17).

In this manner, it is possible to detect a natural reaction of the user in a case where communication quality is degraded on the basis of user's subjective evaluation, to grasp communication quality based on the user's subjective evaluation, and to provide a feedback to the base station and the network in the first embodiment illustrated in FIGS. 1 to 5. It is thus possible to concentrate wireless resources on users or areas that truly require the wireless resources and thereby to improve QoE (communication quality) based on the user's subjective evaluation in the first embodiment illustrated in FIGS. 1 to 5.

Also, it is possible to enable wireless resource control in accordance with QoE by associating the user's quality of experience (QoE) with the user's action and providing a feedback of a specific user's action in the first embodiment illustrated in FIGS. 1 to 5. For example, it is possible to detect an area with low QoE and to add wireless resources to the area by using the user's unintentional action of shaking the terminal in a poor communication environment in the first embodiment illustrated in FIGS. 1 to 5. In other words, it is possible to concentrate wireless resource on users or areas that truly require the wireless resources by allowing users to directly feed back QoE (communication quality) based on the users' subjective evaluation that is difficult to be estimated, in the first embodiment illustrated in FIGS. 1 to 5.

Configuration of Second Embodiment

Figure 6:
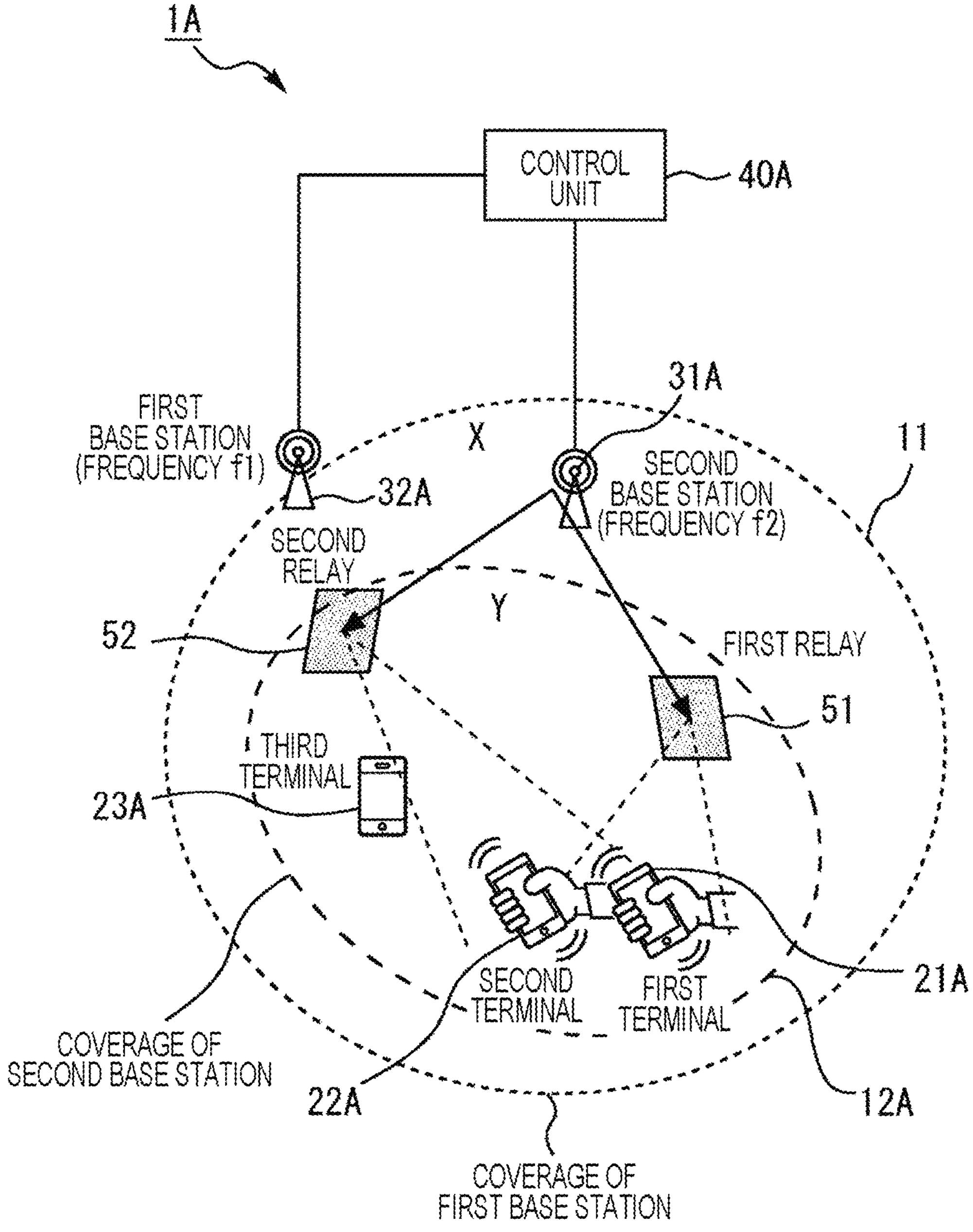
FIG. 6 is a diagram illustrating a configuration example of a wireless communication system according to a second embodiment.

FIG. 6 is a diagram illustrating a configuration example of a wireless communication system 1A according to a second embodiment. Note that in the second embodiment, the same reference signs will be applied to configurations similar to those in the first embodiment illustrated in FIGS. 1 to 5 and detailed description will be omitted or simplified.

As illustrated in FIG. 6, the wireless communication system 1A includes a first terminal 21A, a second terminal 22A, a third terminal 23A, a first base station 31A, a second base station 32A, a control unit 40A, a first relay device 51, and a second relay device 52.

Each of the first terminal 21A, the second terminal 22A, and the third terminal 23A can be connected to both the first base station 31A and the second base station 32A. Also, the first terminal 21A, the second terminal 22A, and the third terminal 23A are always connected to the first base station 31A. Note that the first terminal 21A, the second terminal 22A, and the third terminal 23A will be referred to as "terminals 20A" below when they are collectively referred to in the present embodiment. The terminal 20A has a sensing function for detecting a user's action.

The first base station 31 is a base station or an extension station and forms a coverage (a range in which radio waves can be received) 11 of a frequency band f1. A coverage 11 of a frequency band f1 is an area X in FIG. 6.

The second base station 32A is a base station or an extension station and forms a coverage 12A of a frequency band f2. The coverage 12A of the frequency band f2 is an area Y in FIG. 6. The coverage 12A of the frequency band f2 is disposed to be superimposed in the coverage 11 of the first base station 31 in FIG. 6. It is possible to improve communication quality by superimposing the coverage 12A of the second base station 32A on the coverage 11 of the first base station 31A. Note that the first base station 31 and the second base station 32A will be referred to as "base stations 30A" below when they are collectively referred to in the present embodiment.

The control unit (wireless communication device) 40A is, for example, an external server, a CU, DU, or gNodeB and is connected to the first base station 31A and the second base station 32A. Note that the control unit 40A is an example of a "wireless communication device".

The first relay device 51 and the second relay device 52 relay the second base station 32A of the frequency band f2. Note that the first relay device 51 and the second relay device 52 may also be referred to as a "first relay 51" and a "second relay 52" in the present embodiment. Also, the first relay device 51 and the second relay device 52 will be referred to as "relay devices 50" or "relays 50" when they are collectively referred to in the present embodiment.

The relay devices (relays) 50 are, for example, smart repeaters, intelligent reflectors (Reconfigurable Intelligent Surfaces: RISs), or the like and are devices capable of controlling coverages by changing parameters. Each relay device 50 is installed at a different location.

Figure 7:
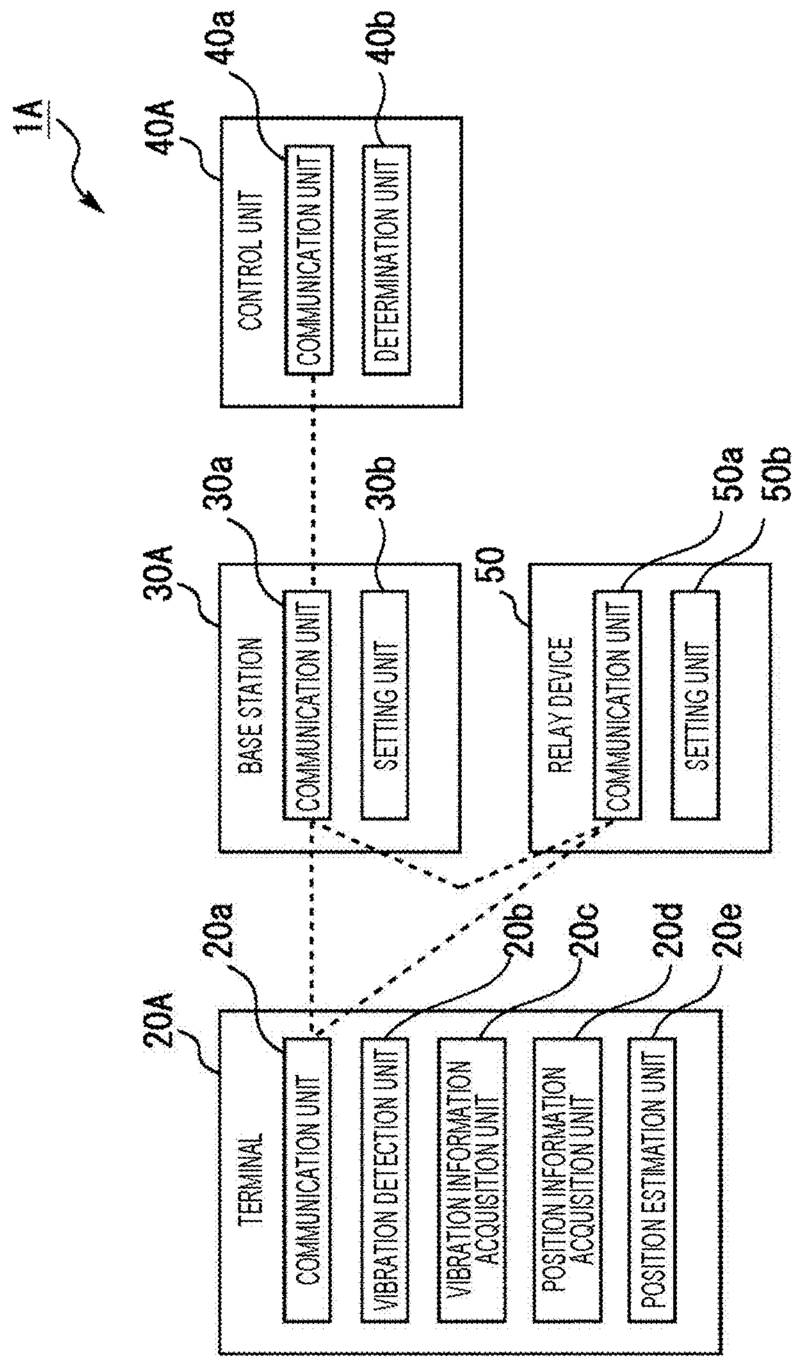
FIG. 7 is a diagram illustrating configurations that terminals, base stations, a control unit, and relay devices illustrated in FIG. 6 have.

FIG. 7 is a diagram illustrating an example of configurations that the terminals 20A, the base stations 30A, the control unit 40A, and the relay devices 50 illustrated in FIG. 6 have. Note that illustration of general configurations that the ordinary terminal 20A, the base stations 30A, the control unit 40A, and the relay devices 50 have will be omitted in FIG. 7

In each terminal 20A, the communication unit 20*a* transmits and receives information and signals to and from the relay device 50 as well. Note that since the other configuration of the terminal 20A are similar to the configuration of the terminal 20 in the first embodiment, description thereof will be omitted.

In each base station 30A, the communication unit 30*a* transmits and receives information and signals to and from the relay device 50 as well. Note that the other configuration of the base station 30A is similar to the configuration of the base station 30 in the first embodiment, description thereof will be omitted.

The control unit (wireless communication device) 40A is, for example, an external server, a CU, DU, or gNodeB and is connected to the first base station 31A and the second base station 32A. The control unit 40A has configurations or functions of a communication unit 40*a* and a determination unit 40*b*.

The communication unit 40*a* is connected to the base station 30A in a wired or wireless manner and transmits and receives information or signals to and from it. The communication unit 40*a* receives information and signals transmitted from the base station 30A and transmits information and signals of the control unit 40A to the base station 30A, for example.

The determination unit 40*b* determines a coverage 13 of the first relay device 51 and a coverage 14 of the second relay device 52 by using a terminal notification signal provided as a notification from the terminal 20A via the base station 30A. The determination unit 40*b* evaluates presence/absence of detecting terminals, the number of detecting terminals, and the number of times of detection, for example, and determines the coverage 13 to be covered by the first relay device 51 and the coverage 14 to be covered by the second relay device 52.

The relay device 50 has a communication unit 50*a* and a setting unit 50*b*.

The communication unit 50*a* is connected to the terminal 20A, the base station 30A, and another relay device 50 in a wired or wireless manner and transmits and receives information or signals to and from these. The communication unit 50*a* receives information or signals transmitted from the terminal 20A, the base station 30A, or another relay device 50 and transmits them to another terminal 20, base station 30A, or relay device 50, for example.

The setting unit 50*b* sets a designation parameter provided as a notification from the base station 30A, for example.

Operation of Second Embodiment

Figure 8:
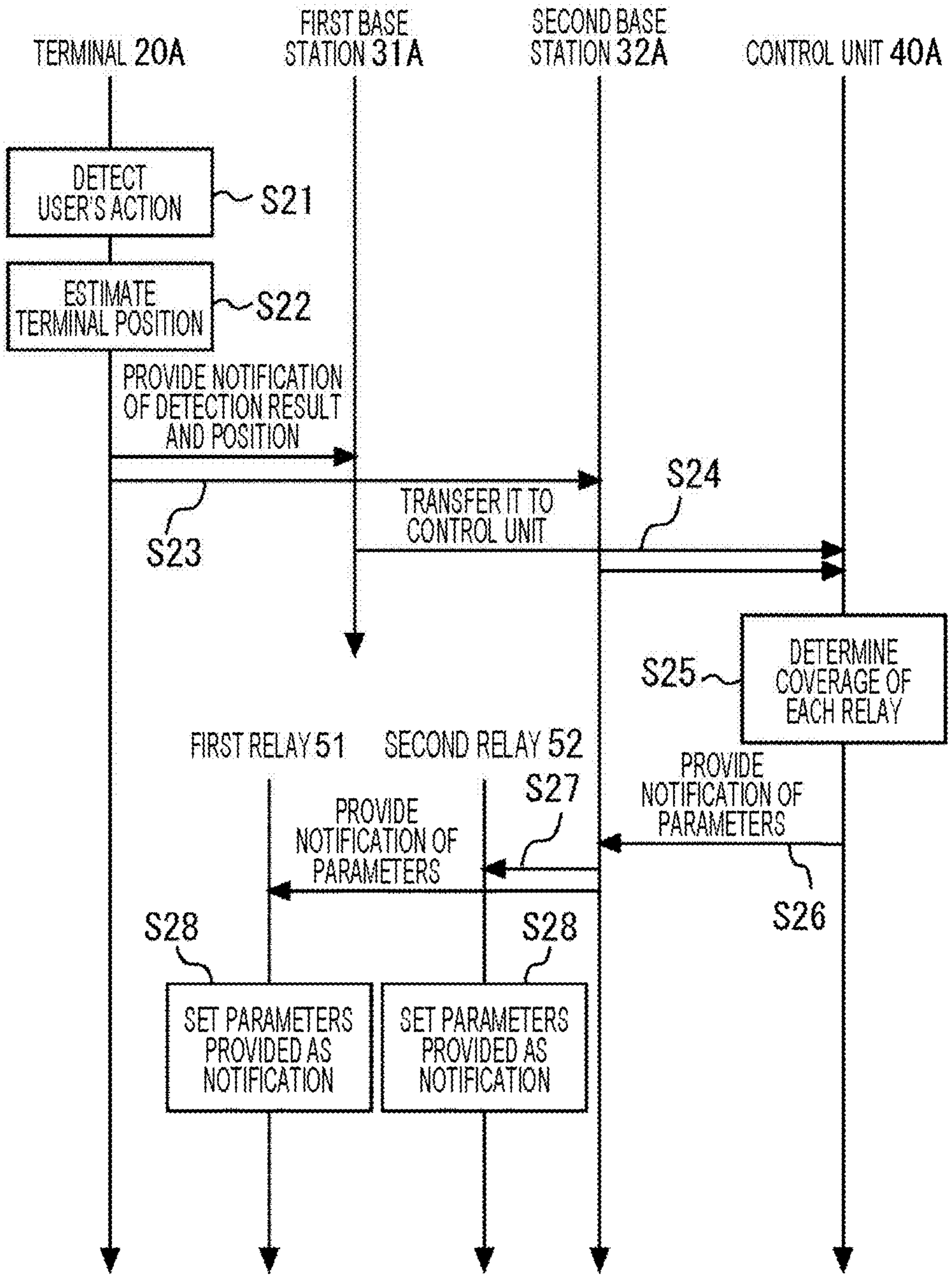
FIG. 8 is a diagram illustrating a processing flow of the wireless communication system illustrated in FIGS. 6 and 7.

FIG. 8 is a diagram illustrating a processing flow of the wireless communication system 1A illustrated in FIGS. 6 and 7.

Since processing in steps S21 to S23 is similar to the processing in steps S11 to S13 in the first embodiment illustrated in FIGS. 1 to 5, description thereof will be omitted. Note that in step S23, the terminal 20A may notify not only the first base station 31A but also the second base station 32A of the user's action information and the position information.

In step S24, the first base station 31A (or the second base station 32A) transfers, to the control unit 40A, a terminal notification signal including the user's action information and the position information provided as a notification from the terminal 20A.

In step S25, the control unit 40A determines the coverages 13 and 14 to be covered by the relay devices 50, respectively, by using the information of the terminal notification signal provided as a notification from the first base station 31A (or the second base station 32A). At this time, the control unit 40A evaluates presence/absence of detecting terminals, the number of detecting terminals, and the number of times of detection and determines the coverages 13 and 14 to be covered by the relay devices 50, respectively.

In step S26, the control unit 40A notifies the second base station 32A of control parameters needed by the relay devices 50 to set the areas determined by the control unit 40A as the coverages 13 and 14.

In step S27, the second base station 32A notifies each relay device 50 of the control parameters (a communication parameter, a designation parameter) needed by the relay devices 50 to set the coverages 13 and 14 in the notification from the control unit 40A.

In step S28, each relay device 50 sets the control parameters (the communication parameter, the designation parameter) provided as a notification from the control unit 40A.

Figure 9:
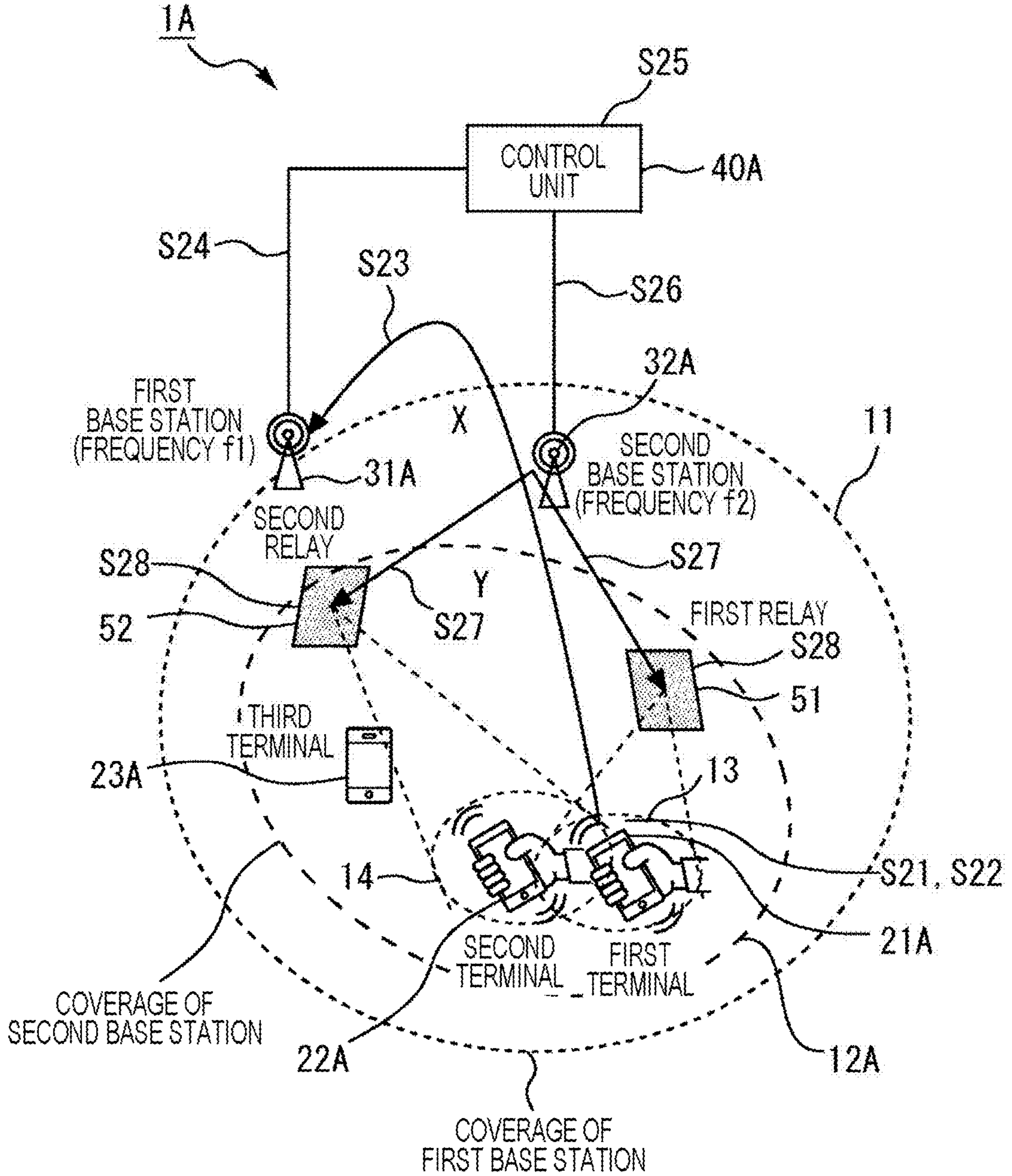
FIG. 9 is a diagram illustrating an example of operations of the wireless communication system illustrated in FIGS. 6 to 8.

FIG. 9 is a diagram illustrating an example of operations of the wireless communication system 1A illustrated in FIGS. 6 to 8. Note that FIG. 9 will be described with the same step reference numbers applied to the same operations as the operations in the steps in FIG. 8.

In step S21, the terminal 20A detects a predetermined action of the user. As illustrated in FIG. 9, the user of the first terminal 21A shakes the first terminal 21A as an intuitive action when he/she feels degradation of QoE, for example. Similarly, the user of the second terminal 22A shakes the second terminal 22A as an intuitive action when he/she feels degradation of QoE. The first terminal 21A and the second terminal 22A detect the shaking. The first terminal 21A and the second terminal 22A determines which of vibration applied in response to degradation of QoE and vibration generated when the first terminal 21A and the second terminal 22A are carried the vibration applied to the first terminal 21A and the second terminal 22A are, from how the vibration is applied, respectively. For example, it is possible to make the determination through machine learning or the like. Each of the first terminal 21A and the second terminal 22A measures the cumulative duration times of the vibration and the number of times of vibration applied in response to degradation of QoE in a specific period of time.

In step S22, the terminal 20A estimates the position of the terminal 20A. For example, when the first terminal 21A detects a predetermined user's action in step S21, the position information of the first terminal 21A is estimated by using information acquired by the position information acquisition unit 20*d* (a GPS, for example) mounted on the first terminal 21A, for example. The second terminal 22A also estimates the position information of the second terminal 22A in a method similar to that of the first terminal 21A.

In step S23, the first terminal 21A and the second terminal 22A associate the user's action information detected in step S21 with the position information estimated in step S22 and provides notifications from the first terminal 21A and the second terminal 22A that are detecting terminals to the first base station 31A. Note that the first terminal 21A and the second terminal 22A may notify not only the first base station 31A but also the second base station 32A of the user's action information and the position information.

In step S24, the first base station 31A (or the second base station 32A) transfers (notifies) a terminal notification signal that is information provided as a notification from the first terminal 21A and the second terminal 22A to the control unit 40A.

In step S25, the control unit 40A determines the coverages 13 and 14 to be covered by the relay devices 50 by using the information of the terminal notification signal including the user's action information and the position information provided as a notification from the first base station 31 (or the second base station 32A). At this time, the control unit 40A evaluates presence/absence of detecting terminals, the number of detecting terminals, and the number of times of detection and determines the coverages 13 and 14 to be covered by the relay devices 50, respectively. For example, the control unit 40A determines which areas are to be set as the coverages 13 and 14 to be covered by the relay devices 50 from the cumulative duration time and the number of times of vibration provided as a notification or a score or the like calculated by using them.

Figure 10:
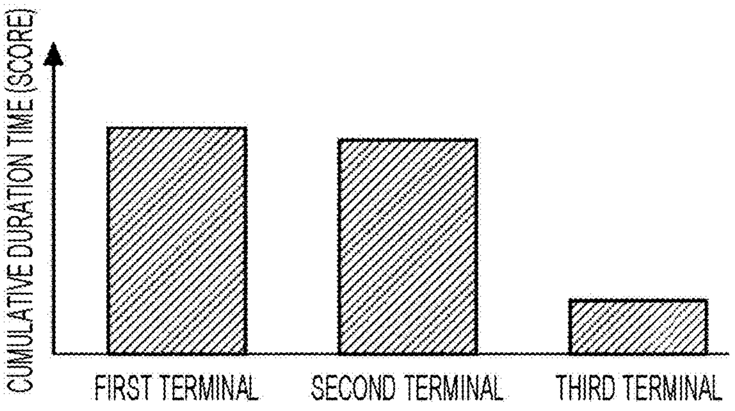
FIG. 10 is a diagram illustrating a cumulative duration time (or a score) for each terminal.

FIG. 10 is a diagram illustrating a cumulative duration time (or a score) for each terminal. In FIG. 10, the horizontal axis represents the first terminal 21A, the second terminal 22A, and the third terminal 23A, and the vertical axis represents the cumulative duration time during which the terminal notification signal is provided as a notification (or the score).

In FIG. 10, in regard to the longest cumulative duration time during which the terminal notification signal is notified, the cumulative duration time for the first terminal 21A is the longest, the cumulative duration time for the second terminal 22A is the second longest, and the cumulative duration time for the third terminal 23A is the shortest. In this case, the control unit 40A compares the cumulative duration time for each terminal and selects the first terminal 21A with the longest cumulative duration time and the second terminal 22A with the second longest cumulative duration time, for example. Then, the control unit 40A can determine that the first terminal 21A is relatively close to the first relay device 51 and thus determines that the coverage 13 to be covered by the first relay device 51 on the assumption that the first relay device 51 covers the first terminal 21A. Similarly, the control unit 40A can determine that the second terminal 22A is relatively close to the second relay device 52 and thus determines the coverage 14 to be covered by the second relay device 52 on the assumption that the second relay device 52 covers the second terminal 22A.

Note that the control unit 40A may express the cumulative duration time and the number of times of vibration as scores and determine such a coverage that maximizes the total of the scores of the terminals 20A that can be present in the coverage of each relay device 50. Since the first terminal 21A and the second terminal 22A are close to each other in the situation in FIG. 10, for example, it is possible to accommodate them in the same coverage at the same time. On the other hand, the third terminal 23A is located away from the first terminal 21A and the second terminal 22A, it is not possible to accommodate them in the same coverage at the same time. In this case, the control unit 40A may maximize the stores by accommodating the first terminal 21A and the second terminal 22A in the same coverages 13 and 14 at the same time for the first relay device 51 and the second relay device 52.

Also, the control unit 40A may distribute time resources for each relay device 50 regarding the areas as coverages in accordance with the scores. For example, control of using 80% of time resources for the area including the first terminal 21A and the second terminal 22A and using the remaining resources to set the area including the third terminal 23A as coverage may be performed in the situation in FIG. 10. In other words, the control unit 40A may switches the area that each relay device 50 regards as a coverage in a time division manner.

Returning to FIG. 9, the control unit 40A notifies the second base station 32A of control parameters needed by the first relay device 51 and the second relay device 52 to set the areas determined by the control unit 40A as the coverages 13 and 14 in step S26. For example, the control unit 40A notifies the second base station 32A of an antenna tilt, an antenna direction, a beamforming weight, an amplification gain, and the like. Note that the control unit 40A sets the positions of the first relay device 51 and the second relay device 52 and provides the notification thereto in a case where they are movable.

In step S27, the second base station 32A notifies the first relay device 51 of the control parameters (the communication parameter, the designation parameter) needed by the first relay device 51 to set the coverage 13 that has been provided as a notification from the control unit 40A. Similarly, the second base station 32A notifies the second relay device 52 of the control parameters (the communication parameter, the designation parameter) needed by the second relay device 52 to set the coverage 14 that has been provided as a notification from the control unit 40A.

In step S28, each of the first relay device 51 and the second relay device 52 sets the control parameters (the communication parameter, the designation parameter) provided as a notification from the control unit 40A.

Effects and Advantages of Second Embodiment

As described above, advantages similar to those of the first embodiment illustrated in FIGS. 1 to 5 are exhibited in the second embodiment illustrated in FIGS. 6 to 10.

In addition, the first relay device 51 and the second relay device 52 that relay the second base station 32A of the frequency band f2 are used, and the control unit 40A determines the coverages 13 and 14 to be covered by the first relay device 51 and the second relay device 52 (S25) in the second embodiment illustrated in FIGS. 6 to 10. Therefore, it is possible to set the coverages in more detail in the second embodiment illustrated in FIGS. 6 to 10 than in the first embodiment illustrated in FIGS. 1 to 5.

In this manner it is possible to concentrate wireless resources on users or areas that truly require the wireless resources in more detail in the second embodiment illustrated in FIGS. 6 to 10 than in the first embodiment and thereby to improve QoE (communication quality) based on user's subjective evaluation in more detail than in the first embodiment.

Configuration of Third Embodiment

Figure 11:
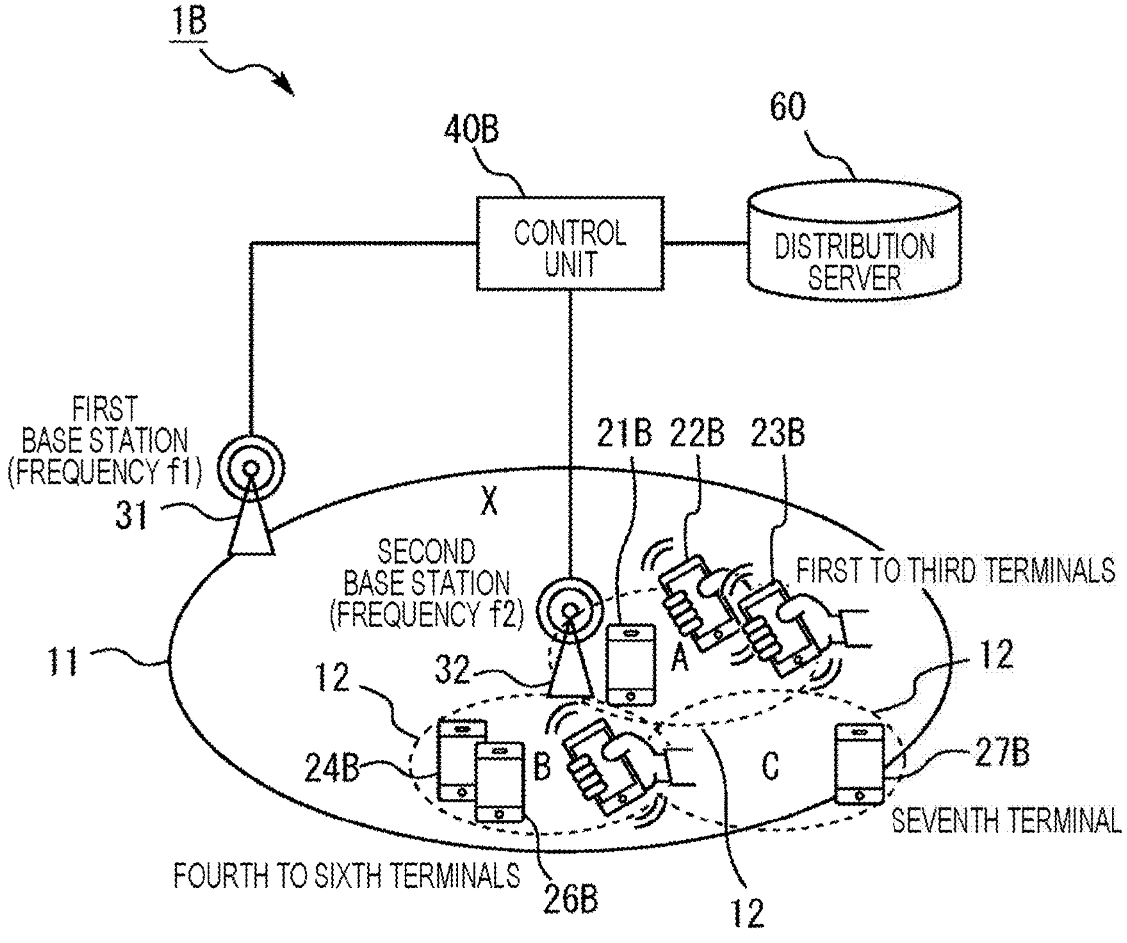
FIG. 11 is a diagram illustrating a configuration example of a wireless communication system according to a third embodiment.

FIG. 11 is a diagram illustrating a configuration example of a wireless communication system 1B according to a third embodiment. Note that in the third embodiment, the same reference signs will be applied to components similar to those in the first embodiment illustrated in FIGS. 1 to 5 and the second embodiment illustrated in FIGS. 6 to 10, and detailed description will be omitted or simplified. Note that although the third embodiment will be described below on the basis of the first embodiment illustrated in FIGS. 1 to 5, it is also possible to similarly apply it to the second embodiment illustrated in FIGS. 6 to 10 as well.

As illustrated in FIG. 11, the wireless communication system 1B has a first terminal 21B to a seventh terminal 27B, a first base station 31, a second base station 32, a control unit 40B, and a distribution server 60.

Each of the first terminal 21B to the seventh terminal 27B can be connected to both the first base station 31 and the second base station 32. Also, the first terminal 21B to the seventh terminal 27B are always connected to the first base station 31. Note that the first terminal 21B to the seventh terminal 27B will be referred to as "terminals 20B" below when they are collectively referred to in the present embodiment. The terminal 20B has a sensing function for detecting a user's action. Also, the terminal 20B includes a display unit 20*f* having a Graphical User Interface (GUI) for checking communication quality in real time (see FIG. 12). Note that the display unit 20*f* will also be referred to as a "GUI 20*f*" in the present embodiment.

Since the first base station 31 and the second base station 32 are similar to the first base station 31 and the second base station 32 in the first embodiment illustrated in FIGS. 1 to 5, description thereof will be omitted.

The control unit (wireless communication device) 40B is, for example, an external server, a CU, a DU, or a gNodeB and is connected to the first base station 31, the second base station 32, and the distribution server 60. The control unit 40B determines a coverage 12 of the second base station 32 by using a terminal notification signal. Also, the control unit 40B transmits (notifies) the determined coverage to the distribution server 60. Note that the control unit 40B is an example of a "wireless communication device".

The distribution server 60 distributes, to the terminal 20B, the coverage 12 after being controlled by the control unit 40B, a predicted value of a communication speed (other communication performance) at each point, and the like.

Figure 12:
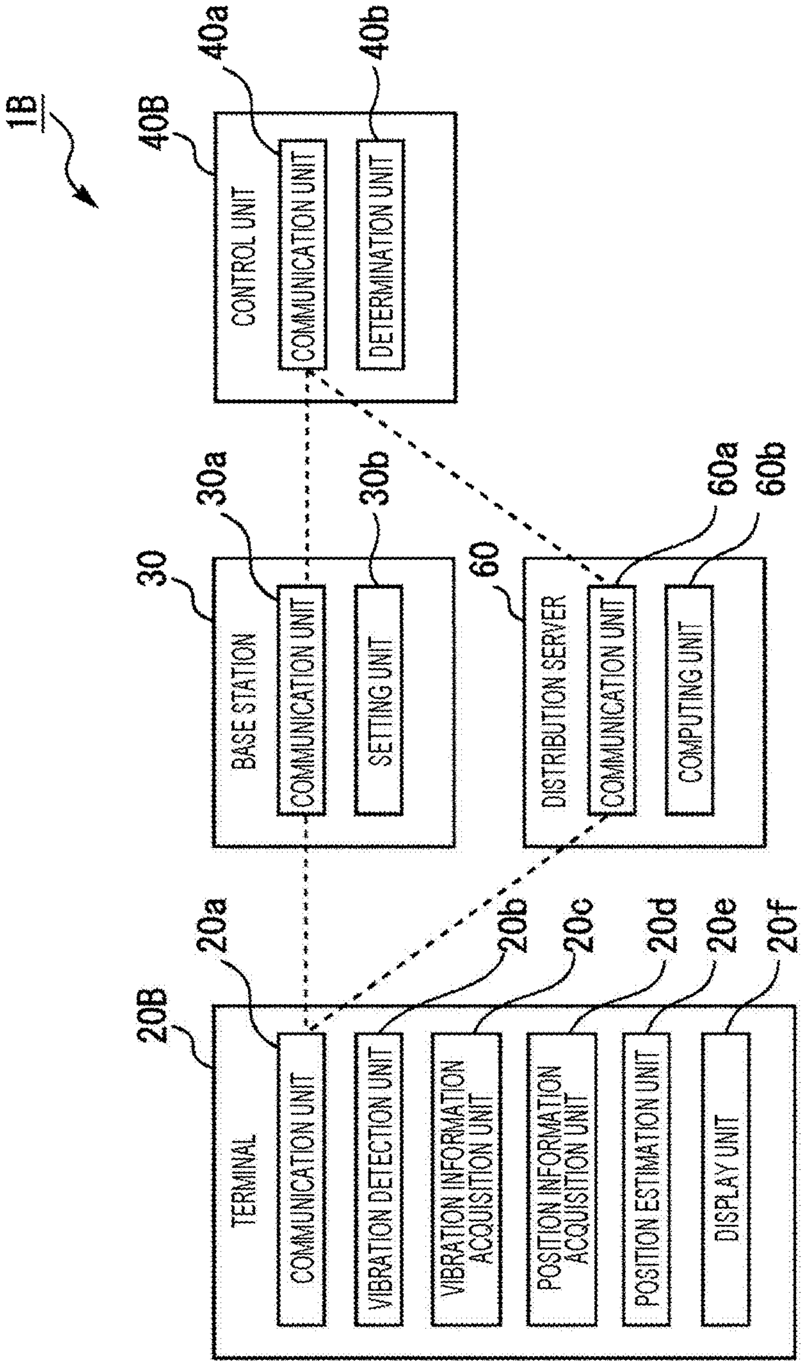
FIG. 12 is a diagram illustrating an example of configurations that terminals, base stations, a control unit, and a distribution server illustrated in FIG. 11 have.

FIG. 12 is a diagram illustrating an example of configurations that the terminals 20B, the base stations 30, the control unit 40B, and the distribution server 60 illustrated in FIG. 11 have. Note that illustration of general configurations that the ordinary terminals 20B, the base stations 30, the control unit 40B, and the distribution server 60 have is omitted in FIG. 12.

The terminal 20B is an information communication terminal such as a smartphone or a tablet terminal, for example and has a communication unit 20*a*, a vibration detection unit 20*b*, a vibration information acquisition unit 20*c*, a position information acquisition unit 20*d*, a position estimation unit 20*e*, and a display unit (GUI) 20*f*.

In the terminal 20B, the communication unit 20*a* transmits and receives information and signals to and from the distribution server 60 as well. Since the other configurations of the communication unit 20*a*, the vibration detection unit 20*b*, the vibration information acquisition unit 20*c*, the position information acquisition unit 20*d*, and the position estimation unit 20*e* in the terminal 20B are similar to the configurations in the terminal 20 in the first embodiment, description thereof will be omitted.

The display unit (GUI) 20*f* has an operation and display function in the GUI format. The display unit 20*f* displays (GUI displays) information and a power relationship diagram distributed from the distribution server 60. The GUI-displayed information and power relationship are updated at predetermined time intervals or in real time.

Since the base station 30 has a configuration similar to that of the base station 30 in the first embodiment, description thereof will be omitted.

In the control unit (wireless communication device) 40B, the communication unit 40*a* transmits and receives information or signals to and from the distribution server 60 as well. Note that since the other configuration of the control unit 40B is similar to the configuration of the control unit 40 in the first embodiment, description thereof will be omitted.

The distribution server 60 has a communication unit 60*a* and a computing unit 60*b*.

The communication unit 60*a* is connected to the control unit 40B and the terminal 20B in a wired or wireless manner and transmits and receives information or signals to and from these. The communication unit 60*a* receives information and signals transmitted from the control unit 40B and transmits information and signals of the distribution server 60 to the control unit 40B, for example. Also, the communication unit 60*a* distributes, to the terminal 20B, information received from the control unit 40B and computed by the computing unit 60*b* for GUI display.

The computing unit 60*b* has a processor, which is not illustrated, such as a CPU, an MPU, or a GPU that operates by executing a program, for example. The computing unit 60*b* causes the processor, which is not illustrated, to operate by executing a predetermined program stored in a memory 92 (see FIG. 15), which will be described later, and performs predetermined computing and distribution, for example. Note that each function of the computing unit 60*b* may be implemented by a control program executed by a computing processing device in the computing unit 60*b*. Also, each of these functions may be implemented by hardware.

The computing unit 60*b* computes the coverage 12 after being controlled by the control unit 40B (the areas A, B, or C, for example), the predicted value of the communication speed (other communication performance) at each point, and the like such that the terminal 20B can display them in the GUI format, on the basis of the information received from the control unit 40B. Also, the computing unit 60*b* creates a power relationship diagram such that the terminal 20B can display it in the GUI format on the basis of the computing result.

For example, the computing unit 60*b* may perform computing and creation of the power relationship diagram such that the predicted values can be displayed by using specific numerical values or may perform computing and creation of the power relationship diagram such that display can be performed the terminal 20B by using abstract display such as color shading. At this time, the computing unit 60*b* may estimate QoE for each location (area) in consideration of a degree of an actual requirement for utilization and be able to display the estimation result. Note that the configuration or the function of the computing unit 60*b* may be included by the control unit 40B or may be included in another control unit, another external server, or the like.

Operations in Third Embodiment

Figure 13:
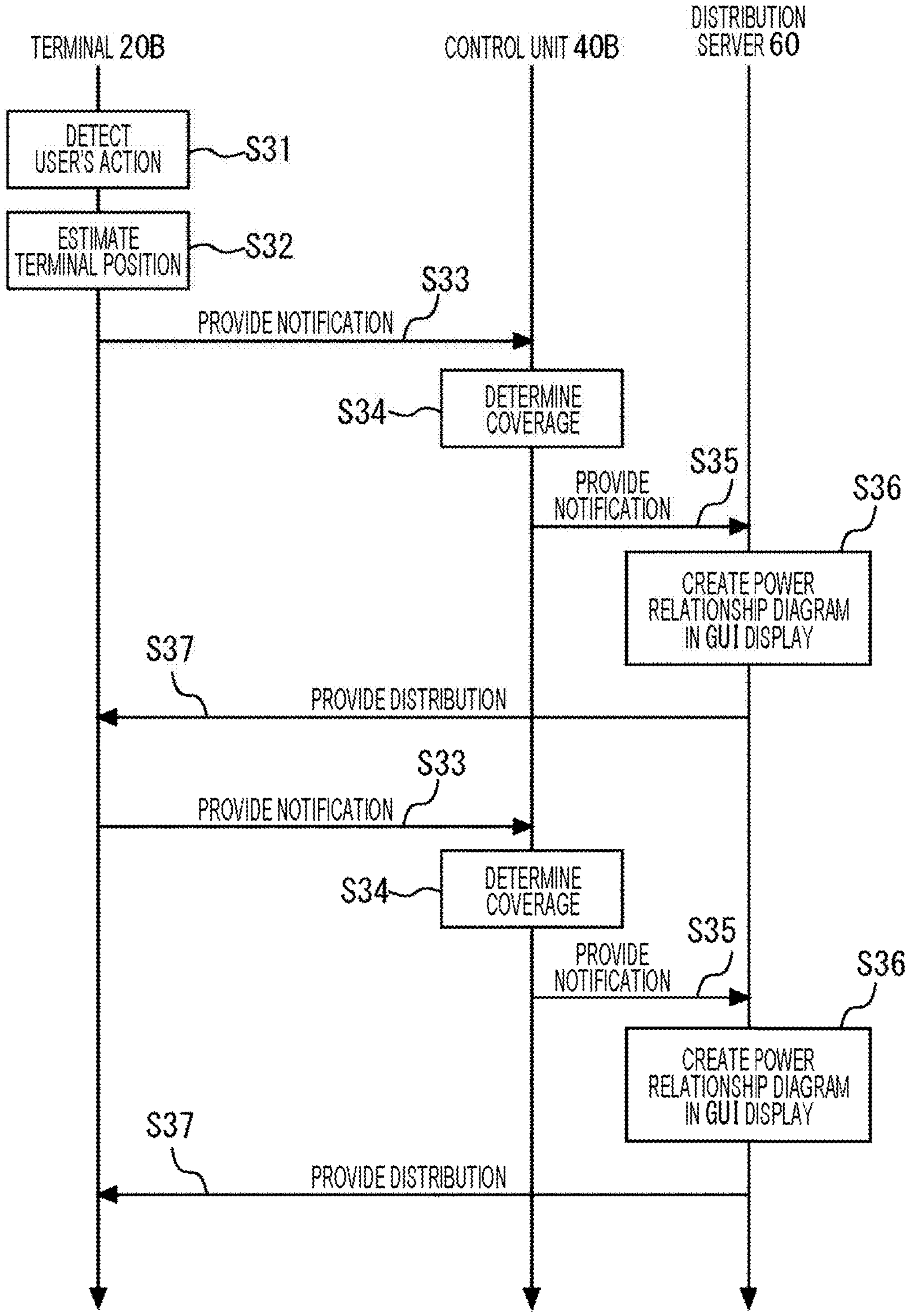
FIG. 13 is a diagram illustrating a processing flow of the wireless communication system illustrated in FIGS. 11 and 12.

FIG. 13 is a diagram illustrating a processing flow of the wireless communication system 1B illustrated in FIGS. 11 and 12. Although FIG. 13 will be described below on the basis of the first embodiment illustrated in FIGS. 1 to 5, the third embodiment may also be similarly applied to the second embodiment illustrated in FIGS. 6 to 10 as described above.

Note that since control performed by the control unit 40B on the base station 30 and the relay device 50 in the third embodiment is similar to that in the first embodiment or the second embodiment, illustration of the base station 30 and the relay device 50 in FIG. 13 and detailed description of the control will be omitted. Also, although one terminal 20B is illustrated in FIG. 13, similar operations are performed even in a case where a plurality of terminals 20B are included. Note that in that case, distribution information from the distribution server 60 is broadcasted or multicasted.

In steps S31 to S34, processing similar to that in steps S11 to S17 in the first embodiment illustrated in FIGS. 1 to 5 is performed. Therefore, description of the processing in steps S31 to S34 will be omitted here.

In step S35, the control unit 40B notifies the distribution server 60 of the coverage 12 determined by the control unit 40B.

In step S36, the distribution server 60 performs computing and creation of a power relationship diagram such that the terminal 20B can display the coverage 12 determined by the control unit 40B, the predicted value of the communication speed at each point, and the like in the GUI format, on the basis of the information provided as a notification from the control unit 40B. Note that the distribution server 60 may create the diagram to display, in a corresponding area, a numerized communication quality improved by adding the coverage or may create the diagram to be displayed by using a color instead of the numerical value.

In step S37, the distribution server 60 distributes the GUI power relationship diagram created in step S36 to the terminal 20B. At this time, in a case where there are a plurality of terminals 20B, the GUI power relationship diagram is simultaneously distributed (broadcasted) to the plurality of terminals 20B. Note that the GUI power relationship diagram may be simultaneously distributed (multicasted) only to predetermined terminals 20B.

Figure 14:
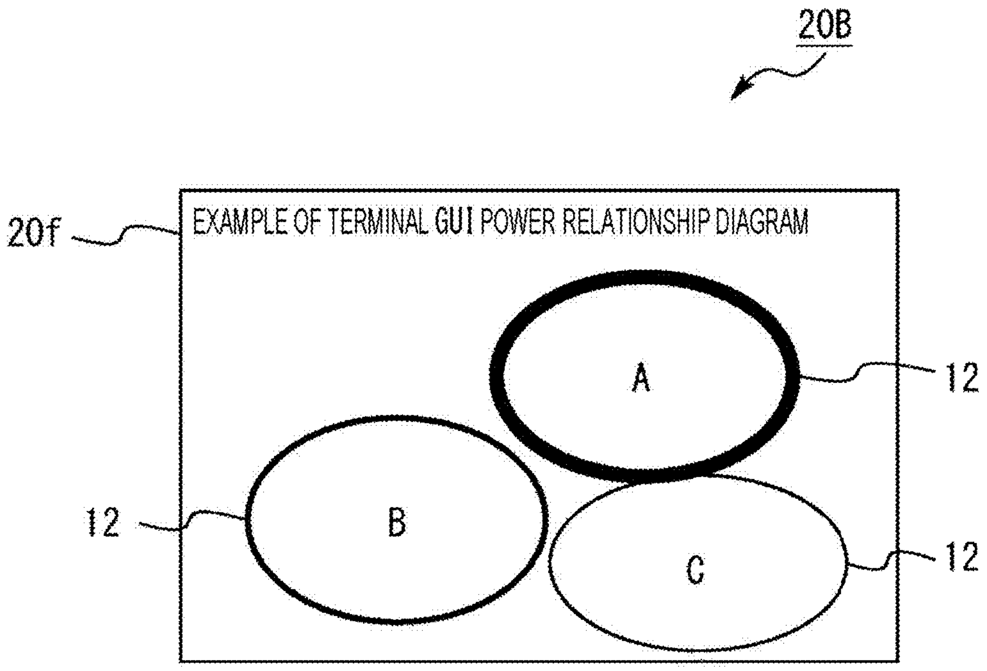
FIG. 14 is a diagram illustrating a display example of a GUI power relationship diagram displayed on a terminal.

FIG. 14 is a diagram illustrating a display example of the GUI power relationship diagram displayed on the terminal 20B. In FIG. 14, the outside square indicates the display unit 20*f* of the terminal 20B, and the three ovals represent areas A, B, and C that can be set as coverages by the second base station 32.

FIG. 14 illustrates a display example in a case where the predicted value of the communication speed (other communication performance) at each point is expressed with a color tone. The example in FIG. 14 is an example in which more users' actions (for example, actions of shaking the terminals) have been observed in the order of the areas A, B, and C, and an example in which the areas A, B, and C are illustrated with darker colors in this order is illustrated. Note that the display method is not limited thereto, and any user interface that stirs up a speculative spirit may be used. Also, the GUI power relationship diagram may be based on group competition.

For example, each user of the terminal 20B who has checked distribution information from the distribution server 60 promotes an improvement in QoE by visiting a desired area and performing a user's action (shaking the terminal 20B, for example) in order to improve communication quality in the desired area. Presence/absence of coverages is determined, or time resources for the coverages are distributed, in accordance with how larger or smaller (more or less) the users' actions are in the present embodiment as well, similarly to the first embodiment and the second embodiment. Therefore, according to the third embodiment, each user checks the situation at predetermined time intervals or in real time by the distribution information distributed from the distribution server 60 to the terminal 20B, and is promoted to further perform user's action (shaking of the terminal 20B, for example) in accordance with the situation. If competition occurs for the coverages among the users in this manner, it is possible to create a better communication environment for the users as a result.

Returning to FIG. 13, processing in steps S31 to S37 is periodically (at predetermined time intervals) repeated after step S37. Note that the processing in step S31 to S37 may be constantly repeated in real time. In this case, the processing in steps S31 and S32 may not be performed by some of the terminals 20B, or the processing in steps S33 to S37 may be executed periodically or in real time by using information collected until now, for example.

Effects and Advantages of Third Embodiment

As described above, advantages similar to those of the first embodiment illustrated in FIGS. 1 to 5 and the second embodiment illustrated in FIGS. 6 to 10 are exhibited in the third embodiment illustrated in FIGS. 11 to 14.

Also, in the third embodiment illustrated in FIGS. 11 to 14, the distribution server 60 creates the GUI power relationship diagram on the basis of the information provided as a notification from the control unit 40B and distributes it to each terminal 20B (S35 to S37). In this manner, each user who has checked the distribution information distributed from the distribution server 60 to the terminal 20B is promoted to further perform the user's action (shaking the terminal 20B, for example) in accordance with the situation. In other words, in the third embodiment illustrated in FIGS. 11 to 14, a gamification element is added to the wireless resource control, and the wireless coverages and the wireless resources are controlled by using QoE fed back directly from the users. Competition of the coverages occur among the users by such a gamification element being added, and as a result, it is possible to create a better communication environment for each user and to create a communication environment that is closer to QoE based on user's subjective evaluation of each user.

Furthermore, in the third embodiment illustrated in FIGS. 11 to 14, it is possible to concentrate resources on areas which truly require the resources by employing the gamification element that allows the users to cooperate and scramble for the wireless resources in accordance with a specific rule. Note that the GUI power relationship diagram may be based on group competition. This also allows concentration of the resources on the areas where there are more groups truly requiring the wireless resources by allowing the users of the groups to cooperate and scramble for the wireless resources in accordance with the specific rule.

Also, in the third embodiment illustrated in FIGS. 11 to 14, it is possible to clarify and visualize the areas that truly require the wireless resources by the mechanism that allows the users to scramble for the wireless resources (coverages) being employed.

Note that there is a likelihood that QoE based on the users' subjective evaluation may not be satisfied in an area where the users intensively scramble for the coverages. In the third embodiment illustrated in FIGS. 11 to 14, it is also possible for a network administrator to grasp the information by the information being clarified and visualized. As a result, it is possible to promote actions of the network administrator such as enhancement of the network as well in the third embodiment illustrated in FIGS. 11 to 14.

Hardware Configuration Example

Figure 15:
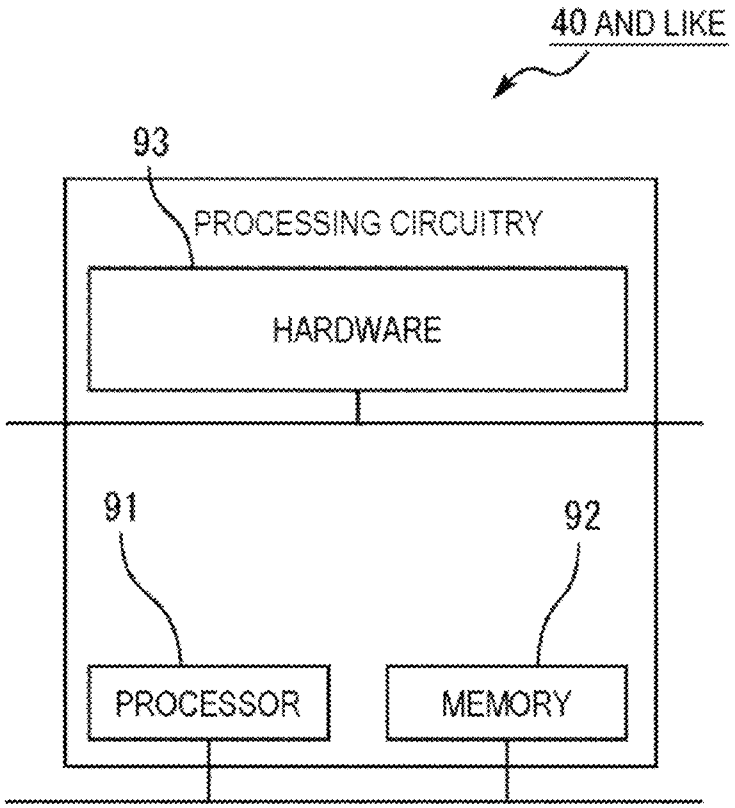
FIG. 15 is a conceptual diagram illustrating a hardware configuration example of processing circuitry that the terminals, the control unit, and the distribution server according to the embodiments illustrated in FIGS. 1 to 14 have.
Figure 16:
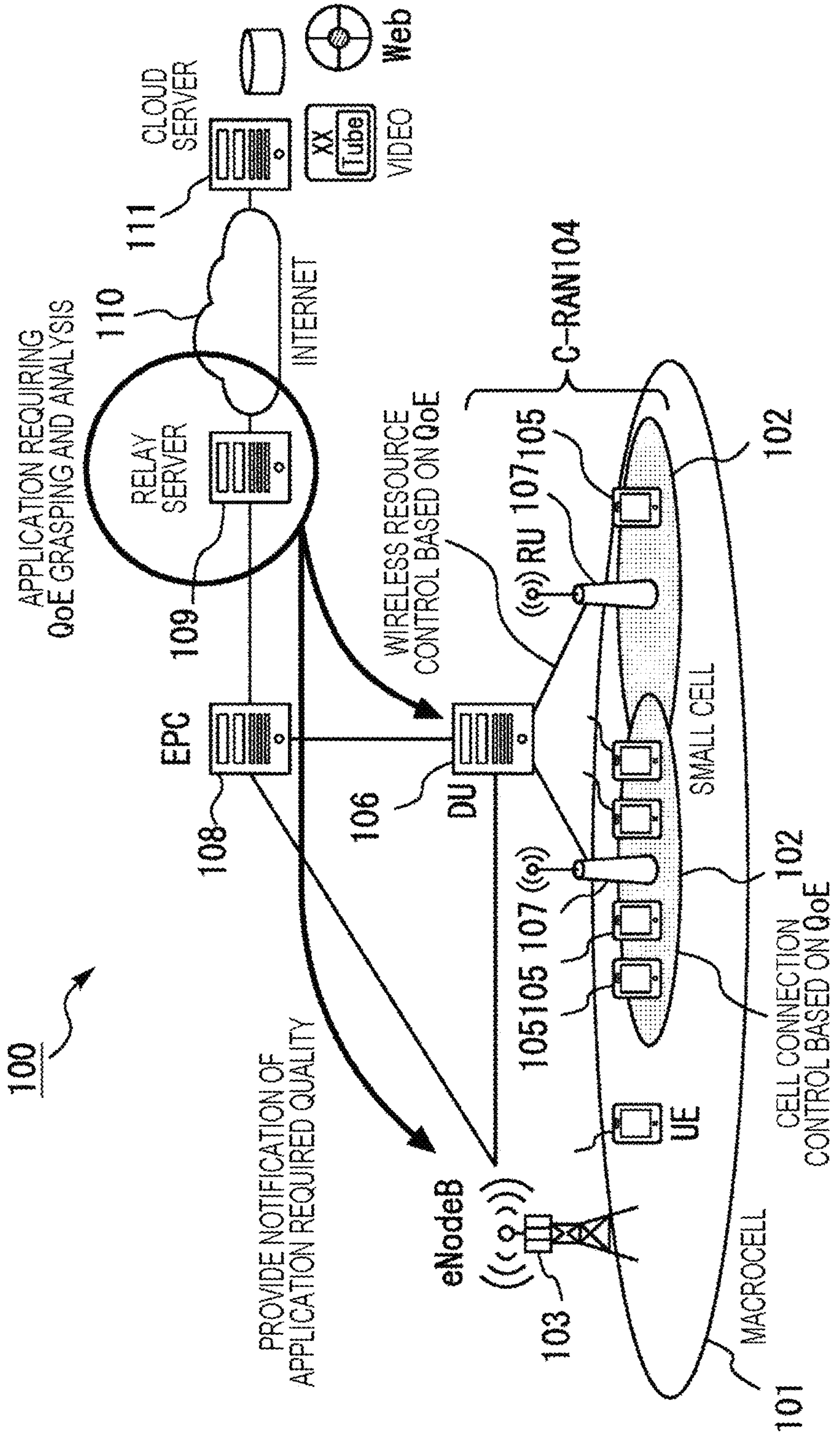
FIG. 16 is a diagram illustrating an overview of a wireless resource control scheme of an LTE base station based on application required quality that is needed to satisfy required QoE in the related art.

FIG. 15 is a conceptual diagram illustrating a hardware configuration example of processing circuitry that the terminals 20, 20A, and 20B, the control units 40, 40A, and 40B, and the distribution server 60 (hereinafter, these will be collectively referred to and illustrated as a "control unit 40 and the like") according to the embodiments illustrated in FIGS. 1 to 14. Each of the aforementioned functions is implemented by processing circuitry. As an aspect, the processing circuitry includes at least one processor 91 and at least one memory 92. As another aspect, the processing circuitry includes at least one dedicated hardware 93.

In a case where the processing circuitry includes the processor 91 and the memory 92, each function is implemented by software, firmware, or a combination of software and firmware. At least one of the software and the firmware is described as a program. At least one of the software and the firmware is stored in the memory 92. The processor 91 implements each function by reading and executing the program stored in the memory 92.

In a case where the processing circuitry includes the dedicated hardware 93, the processing circuitry is, for example, a single circuit, a composite circuit, a programmed processor, or a combination thereof. Each function is implemented by the processing circuitry.

Some or all of the functions that the control unit 40 and the like have may be configured by hardware or may be configured as a program executed by the processor. In other words, the control unit 40 and the like may be implemented by a computer and a program, and the program can be stored in a storage medium or can be provided through a network.

<Supplementary Matters of Embodiments>

As described above, although the embodiments illustrated in FIGS. 1 to 15 have been divided into the first embodiment illustrated in FIGS. 1 to 5, the second embodiment illustrated in FIGS. 6 to 10, and the third embodiment illustrated in FIGS. 11 to 14, some or all of these embodiments may be combined in series or in parallel. In other words, elements in the third embodiment may be combined with the second embodiment, for example, such that competition may occur among users for the coverage set by the relay device 50. By combining the embodiments, the combined embodiments can exhibit effects and advantages exhibited by each of the embodiments before being combined.

Also, although "shaking of the terminal 20 or the like" has been exemplified as the user's action for measuring QoE (user's experience) based on the user's subjective evaluation in the embodiments illustrated in FIGS. 1 to 15, the present invention is not limited thereto, and other actions may be used to measure the user's experience. For example, transmission of a signal indicating that QoE based on user's subjective evaluation has been degraded may be used as the user's action for measuring QoE (user's experience) based on user's subjective evaluation.

Note that transmission of the signal may be triggered by user's tapping of the screen of the terminal 20 or the like. In other words, an area with low QoE may be detected by using a user's action of unintentionally tapping the screen of the terminal 20 or the like many times in a poor communication environment, for example, and wireless resources may be added to the area. In this case, the terminals 20, 20A, and 20B may include a tap detection unit that detects tapping as an example of a "user action detection unit" that detects a user's action performed on the host terminal. Similarly, the terminals 20, 20A, and 20B may include a tap information acquisition unit that acquires information such as a time of tapping, the number of times thereof, and the like as an example of a "user action information acquisition unit" that acquires information regarding a predetermined user's action performed on the host terminal.

Also, although the wireless communication systems 1, 1A, and 1B have been described as examples in an aspect of the present disclosure in the embodiments illustrated in FIGS. 1 to 15, it is also possible to implement them as wireless communication devices that performs processing of the control units 40, 40A, and 40B in the wireless communication systems 1, 1A, and 1B. Additionally, these can also be realized as a wireless communication method that performs processing of each part in the wireless communication systems 1, 1A, and 1B.

Moreover, the present disclosure can also be implemented as a wireless communication program that causes a computer to execute processing steps of the control units 40, 40A, and 40B in the wireless communication systems 1, 1A, and 1B.

Furthermore, the present disclosure can also be implemented as a storage medium (non-transitory computer-readable medium) with the wireless communication program stored therein. The wireless communication program can be stored and distributed in a removable disc such as a Compact Disc (CD), a Digital Versatile Disc (DVD), or a Universal Serial Bus (USB) memory. Note that the wireless communication program may be uploaded on a network via network interfaces or the like which are included in the control units 40, 40A, and 40B and are not illustrated in the drawing, and may be downloaded from the network, and may be stored in the memory 92 or the like.

Features and advantages of the embodiments will become apparent from the above detailed description. This is intended to cover the features and the advantages of the aforementioned embodiments without departing from the spirit and the scope of rights of the claims. In addition, those ordinarily skilled in the technical Field should be able to easily achieve any improvements and modifications. Therefore, there is no intension to limit the scope of the inventive embodiments to the aforementioned embodiments, and it is also possible to rely on appropriate improvements and equivalents thereto included in the scope disclosed in the embodiments.

REFERENCE SIGNS LIST

1, 1A, 1B Wireless communication system
11, 12, 12A, 13, 14 Coverage
20, 20A, 20B Terminal
20*a* Communication unit
20*b* Vibration detection unit (user action detection unit)
20*c* Vibration information acquisition unit (user action information acquisition unit)
20*d* Position information acquisition unit
20*e* Position estimation unit
20*f* Display unit (GUI)
21, 21A, 21B First terminal
22, 22A, 22B Second terminal
23A, 23B Third terminal
24B Fourth terminal
25B Fifth terminal
26B Sixth terminal
27B Seventh terminal
30, 30A Base station
30*a* Communication unit
30*b* Setting unit
31, 31A First base station
32, 32A Second base station
40, 40A, 40B Control unit (control device, wireless communication device)
40*a* Communication unit
40*b* Determination unit
50 Relay device (relay)
50*a* Communication unit
50*b* Setting unit
51 First relay device (first relay)
52 Second relay device (second relay)
60 Distribution server
60*a* Communication unit
60*b* Computing unit
91 Processor
92 Memory
93 Hardware
100 Mobile network
101 Macrocell
102 Small cell
103 eNodeB (LTE Base Station)
104 C-RAN (Centralized wireless access network)
105 UE User terminal
106 DU (Decentralized station)
107 RU (Wireless device)
108 EPC (LTE core network)
109 Relay server
110 Internet
111 Cloud server
A, B, C Area
f1, f2 Frequency band
X, Y Area

The invention claimed is:

1. A wireless communication system comprising:
a first base station that forms a coverage of a first frequency band;
a second base station that forms a coverage of a second frequency band that is different from the first frequency band in a smaller region than a region of the first frequency band with the coverage of the second frequency band superimposed on the coverage of the first frequency band;
a terminal configured to be connected to both the first base station and the second base station; and
a wireless communication device that is connected to both the first base station and the second base station and controls the coverage of the second base station,
wherein the terminal includes
user action detection circuitry that detects a user action,
user action information acquisition circuitry that acquires information regarding the user action when the user action detected by the user action detection circuitry is determined to be a predetermined user action performed on the terminal, and
position estimation circuitry that estimates position information of the terminal, and
the wireless communication device includes determination circuitry that determines the coverage that the second base station covers, on the basis of the information regarding the user action and the position information acquired from the terminal via the first base station or the second base station, and
the determination circuitry determines distribution of time resources in a plurality of areas regarded as coverages by the second base station.

2. The wireless communication system according to claim 1, wherein
the predetermined user action is a user shaking of the terminal or a user tapping of the terminal, and
the information regarding the user action is vibration information generated by the terminal being shaken by the user or tap information generated by the terminal being tapped by the user.

3. The wireless communication system according to claim 1, wherein the determination circuitry specifies an area of the coverage that the second base station covers on the basis of the information regarding the user action.

4. The wireless communication system according to claim 1, further comprising:
a plurality of relay devices that relay the second base station in the second frequency band,
wherein the terminal is connected to the second base station via any of the plurality of relay devices, and
the determination circuitry determines coverages that the plurality of relay devices cover instead of the second base station.

5. The wireless communication system according to claim 1, further comprising:
a distribution server that is connected to the wireless communication device,
wherein the distribution server includes computing circuitry that creates a power relationship diagram by which the terminal is configured to display, in a graphical user interface (GUI) format, a coverage after being controlled by the wireless communication device and a predicted value of a communication speed at each point on the basis of information acquired from the wireless communication device, and communication circuitry that distributes the power relationship diagram created by the computing circuitry to the terminal, and
the terminal further includes display circuitry that displays the power relationship diagram distributed from the distribution server in real time in the GUI format.

6. The wireless communication system according to claim 1,
wherein the distribution server repeatedly performs the creation of the power relationship diagram and the distribution of the created power relationship diagram to the terminal at predetermined time intervals.

7. A wireless communication method performed in a wireless communication system including
a first base station that forms a coverage of a first frequency band,
a second base station that forms a coverage of a second frequency band that is different from the first frequency band in a smaller region than a region of the first frequency band with the coverage of the second frequency band superimposed on the coverage of the first frequency band,
a terminal configured to be connected to both the first base station and the second base station, and
a wireless communication device that is connected to both the first base station and the second base station and controls the coverage of the second base station,
the wireless communication method comprising:
by the terminal, detecting a user action, and in a case where the detected user action is determined to be a predetermined user action performed on the terminal, acquiring information regarding the user action and estimating position information of the terminal; and
by the wireless communication device, determining a coverage that the second base station covers on the basis of the information regarding the user action and the position information acquired from the terminal via the first base station or the second base station, and
by the wireless communication device, determining distribution of time resources in a plurality of areas regarded as coverages by the second base station.

8. A wireless communication device in a wireless communication system including
a first base station that forms a coverage of a first frequency band,
a second base station that forms a coverage of a second frequency band that is different from the first frequency band in a smaller region than a region of the first frequency band with the coverage of the second frequency band superimposed on the coverage of the first frequency band,
a terminal configured to be connected to both the first base station and the second base station, and
a wireless communication device that is connected to both the first base station and the second base station and controls the coverage of the second base station,
the wireless communication device comprising:
determination circuitry that acquires information regarding a user action acquired when the terminal detects the user action and the detected user action is determined to be a predetermined user action performed on the terminal and position information of the terminal estimated by the terminal from the terminal via the first base station or the second base station and determines the coverage that the second base station covers on the basis of the acquired information regarding the user action and the position information, and
the determination circuitry determines distribution of time resources in a plurality of areas regarded as coverages by the second base station.

* * * * *